(12) United States Patent
Ito et al.

(10) Patent No.: US 6,687,386 B1
(45) Date of Patent: Feb. 3, 2004

(54) OBJECT TRACKING METHOD AND OBJECT TRACKING APPARATUS

(75) Inventors: Wataru Ito, Kodaira (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 431 days.

(21) Appl. No.: 09/592,996

(22) Filed: Jun. 13, 2000

(30) Foreign Application Priority Data

Jun. 15, 1999 (JP) .......................................... 11-167746
Jun. 15, 1999 (JP) .......................................... 11-167747

(51) Int. Cl.$^7$ ................................................ G06K 9/00

(52) U.S. Cl. ....................................... 382/103; 382/209

(58) Field of Search ................................. 382/103, 107, 382/209, 215, 216, 217, 218, 219; 340/937; 348/169

(56) References Cited

U.S. PATENT DOCUMENTS

| 5,554,983 A | | 9/1996 | Kitamura et al. ........... 340/937 |
| 5,757,287 A | * | 5/1998 | Kitamura et al. ........... 340/937 |
| 6,075,557 A | * | 6/2000 | Holliman et al. ............. 348/51 |

FOREIGN PATENT DOCUMENTS

| JP | 1013821 | * | 1/1998 | ............ H04N/7/18 |

OTHER PUBLICATIONS

H. Tamura, "Introduction to Computer Image Processing", Soken Publishing Co., pp. 118–125 and 149–153, 1985.
A. Rosenfeld, et al, "Digital Picture Processing", *Academic Press*, pp. 296–303, 1976.

* cited by examiner

Primary Examiner—Leo Boudreau
Assistant Examiner—Ryan J. Miller
(74) Attorney, Agent, or Firm—Antonelli, Terry, Stout & Kraus, LLP

(57) ABSTRACT

A method and an apparatus for detecting an object in the image pickup field by template matching and tracking the detected object. An intruding object is detected from an image acquired by an image pickup device which takes the image of an image pickup field. A template image is formed from the detected object and is stored in a storing unit. A template matching is performed between a present input image of the image pickup field and the template image stored in the storing unit to detect the location of that part of the object which has a maximum degree of coincidence with the template image. An edge detection of the object is performed over a predetermined search area in the present input image which area includes the detected part of the object having a maximum degree of coincidence. Based on results of the edge detection, the detected part of the object is corrected and is determined as the present location of the object. A part of the present input image having the corrected location is a new template image with which the template image stored in the storing unit is updated. Instead of a single template image, a plurality of template images may be used for template matching to assure the tracking of the object with even higher accuracy and stability.

16 Claims, 15 Drawing Sheets

OBJECT TRACKING METHOD AND OBJECT TRACKING APPARATUS

BACKGROUND OF THE INVENTION

The present invention relates to a monitor apparatus using an imaging unit, or in particular to an object tracking method for automatically detecting an object intruding into an imaging field or image pickup field from a video signal inputted from the imaging unit and automatically tracking the motion of the detected object and an object tracking apparatus for adjusting the imaging direction in accordance with the detected motion of the object.

A video monitor apparatus using an imaging unit or image pickup unit such as a camera has been widely used. A monitor system using a video monitor apparatus is in demand, in which an intruding object is automatically detected from the image input from an image input means such as a camera, the motion of the object is automatically tracked and a predetermined announcement or alarm action can be taken, apart from the manned monitoring system in which an intruding object such as a man or an automotive vehicle entering the monitor field is detected or tracked by a human monitor while watching the image displayed on the monitor.

For realizing such an unmanned system, the first step is to detect an intruding object in the view field by a so-called subtraction method or the like. In the subtraction method, the input image obtained by an imaging device such as a television camera (hereinafter referred to as the TV camera) is compared with a reference background image prepared in advance, i.e. an image not including the object to be detected to determine the brightness (or intensity) difference for each pixel and detect an area with a large difference value as an object. The part of the input image (hereinafter referred to as partial image) corresponding to the position of the intruding object detected in this way is registered as a template, so that a position associated with the maximum degree of coincidence with the template image is detected in the sequentially input images. This method is widely known as the template matching, and is described in detail, for example, in the book entitled "Introduction to Computer Image Processing" edited by Hideyuki Tamura, published by Soken Publishing Co. pp. 149–153, 1985. Further, this method is disclosed in "Digital Picture Processing" published by ACADEMIC PRESS pp. 296–303, 1976 and U.S. Pat. No. 5,554,983, the disclosures of each is hereby incorporated herein by reference.

The aforementioned method of tracking an intruding object by template matching poses the problem that with the change of the orientation or posture of the target object (when the target object person turns to the right or turns around, for example), the deviation of the target object from the matching position increases to such an extent that the accurate and stable tracking becomes impossible.

Specifically, the template matching has the property that the pattern portion high in contrast in the template images coincides for matching. In the case where a vehicle is a target object, for example, substantially the whole vehicle facing forward first constituting an object of matching (the input image 802 in FIG. 8) may subsequently proceed in a different direction (orientation) and turn sideways, in which case only the front portion of the turned vehicle constitutes the object of matching. As compared with when the whole vehicle has been the object of matching, the center of matching changes to the front portion of the vehicle and therefore the displacement occurs such that the center of the detected location is deviated from the center of the vehicle to the front portion thereof.

This will be explained with reference to FIG. 8. FIG. 8 is a diagram in which a vehicle running along a curved lane within an imaging field is assumed to be an intruding object for explaining the flow of the tracking processing. Numerals 801*a*, 803*a*, 805*a*, 807*a* designate template images at time points t1−1, t1, t1+1, t1+2, respectively; numerals 801, 803, 805, 807 designate images indicating the updated template images 801*a*, 803*a*, 805*a*, 807*a*, respectively; numerals 802, 804, 806, 808 designate input images at time points t1, t1+1, t1+2, t1+3, respectively; numerals 802*a*, 804*a*, 806*a*, 808*a* designate the positions of the object detected by template matching at time points t1, t1+1, t1+2, t1+3, respectively; and numerals 802*b*, 804*b*, 806*b*, 808*b* designate the positions of the template images in the immediately preceding frame (i.e. the template images at t1−1, t1, t1+1, t1+2, respectively).

In FIG. 8, the template image 801*a* registered at time point t1−1 is an image of a moving vehicle with the front portion thereof directed substantially forward. At time point t1, the template matching is conducted using this template image 801*a* to detect the position moved by the target object, while at the same time updating the template image 801*a* to the template image 803*a*. Then, at time point t1+1, the template image 803*a* is updated to the temperate image 805*a*. Further, at time t1+2, the template image 805*a* is updated to the template image 807*a*. By conducting this process up to time t1+3, the template matching which has thus been conducted on the front portion including the vehicles' lights at the tracking starting time t1 is deviated to the left of the vehicle.

This phenomenon is caused by the fact that the matching is conducted in such a manner as to reduce the deviation of the positions between the input image target for template matching and the image portion high in contrast in the template image. In this case, such a portion is the light of the vehicle. As a result, in the case where the target object turns to the left in FIG. 8, for example, the deviation is leftward, and vice versa.

Further, at time t1, only the vehicle image is included in the template image 801*a*. With the direction change of the target object and the resulting deviation of the template position, however, the image of the background portion other than the object image occupies into the template image 807*a*. In the case where the tracking is continued using a template image like the template image 807*a* including many images other than that of the target object, the target object cannot be matched and the background portion that has occupied into the template is matched. Thus, in the case where the target object changes in direction, for example, the object tracking method using the template matching cannot guarantee the tracking of the target object and cannot assure stable tracking because the pattern of the target object apparently moves, which causes the position of the template to deviate.

Further, the aforementioned method of tracking an intruding object by the template matching, which is the process of detecting the portion of the input image associated with the maximum degree of coincidence with the template image, poses another problem that the target object, if temporarily hidden behind some blocking object, cannot be found. Still another problem is that in the case where a plurality of objects (moving objects) exist in the view field and the target object is temporarily hidden behind another moving object, the template image may be updated undesirably with the blocking object in front of the target object as a template image, thereby making it impossible to track the target object.

An example in which the target object is cannot be tracked is explained with reference to FIG. 14. FIG. 14 is another diagram for explaining the flow of the process for tracking an intruding object in the case where a plurality of moving objects are imaged in superposed relation. Numeral 1801a designates a template image of an object updated at time point t0−1, numeral 1801 a view showing the position of the template image 1801a in the input image at time point t0−1, numeral 1802 the input image at time point t0, numeral 1802a the position of the object detected by template matching at time point t0, numeral 1802a the position of the object detected by template matching at time point t0, numeral 1802b another moving object imaged at time point t0, numeral 1803a the template image at time point t0, numeral 1803 a view showing the position of the template image 1803a in the input image at time pint t0, numeral 1804 the input image at time point t0+1, numeral 1804a the position of the object detected by template matching at time point t0+1, numeral 1804b another moving object imaged at time point t0+1, numeral 1805a a template image of the object updated at time point t0+1, numeral 1805 a view showing the position of the template image 1805a in the input image at time point t0+1, numeral 1806 the input image at time point t0+2, numeral 1806a the position of the object detected by template matching at time point t0+2, numeral 1806b another moving object imaged at time point t0+2, numeral 1807a the template image of the object updated at time point t0+2, numeral 1807 a view showing the position of the template image 1807a in the input image at time point t0+2, numeral 1808 the input image at time point t0+3, numeral 1808a the position of the object detected by template matching at time point t0+3, and numeral 1808b another moving object imaged at time point t0+3.

FIG. 14 explains the manner in which the tracking process is conducted when a man-like object is passed by another man-like object walking from the opposite direction based on the template image 1801a of the first man-like object constituting a target object detected by the difference method at time point t1−1. At time point t1, the matching processing is executed for the input image 1802 using the registered template image 1801a to detect the position 1802a of the target object, while at the same time updating the template image 1801a to the template image 1803a located in the view 1803. In the process, the second man-like object 1802b is distant, and therefore no problem of passing is posed in template matching. Other moving objects 1804b, 1806b passed the front of the target object at time points t1+1 and t1+2 and the position 1804a of the target object could be somehow recognized correctly in the input image 1804 at time point t1+1. In the input image 1806 at time point t1+2, however, another object 1806b is substantially superposed at the position 1806a of the target object, and therefore they cannot be distinguished from each other. Thus, as the template images 1805a and 1807a are updated successively, the image of the man-like object that has passed the front of the target object is included into the template image. Specifically, other moving objects occupy the template image in a greater proportion than the target object, until finally, at time point t1+3, the man-like object 1808b that has passed the front of the target object is erroneously recognized as the position 1808a of the target object, and this particular man-like object 1808b is tracked subsequently. The object tracking method using the template matching, therefore, cannot guarantee that a target object is tracked correctly thereby making stable tracking impossible in the case where another object passes the front of the target object.

A similar phenomenon occurs also in the absence of another moving object. The target object being hidden behind a block is a case in point. In such a case, the template image is occupied in a lesser proportion by the target object, and therefore the tracking is terminated at the particular time point or a template image is updated to a different template image than that of the target object, thereby making the tracking at the next time point difficult.

As described above, the conventional method of tracking an intruding object by template matching has the disadvantage that stable tracking is impossible in the case where the target object changes its orientation or posture considerably.

SUMMARY OF THE INVENTION

An object of the present invention is to provide a reliable object tracking method and apparatus by which the disadvantages of the prior art are obviated and an object can be accurately detected and tracked even in the case where the orientation or posture of the target object is changed considerably.

In order to achieve this object, according to one aspect of the invention, there is provided an object tracking method used with an object tracking apparatus in which a template image is registered, and an object in the imaging field is automatically detected by template matching based on the registered template image and the detected object is automatically tracked, comprising the steps of registering an image including at least a part of a detected object as a template image, detecting the position of a partial image of the input image signal associated with the maximum degree of coincidence between the registered template image and the input image signal by template matching, correcting the detected template position to the position of the object detected based on the edge image of the input image and updating the template image based on the corrected detected position thereby to track the object in the imaging field.

According to another aspect of the invention, there is provided an object tracking apparatus comprising an imaging unit for picking up an image of the monitor range for detecting and tracking an object in the imaging field, a pan and tilt head for changing the direction of the view field of the imaging unit, an image input interface for converting the video signals acquired by the imaging unit sequentially into image signals, an image processor for processing the image signals converted by the image input interface, and a pan and tilt head control interface for supplying a control signal for controlling the pan and tilt head to enable the image processor to change the direction of the view field of the imaging unit, wherein the image processor matches a template registered in advance with the image signals sequentially input from the imaging unit, the template matching position is corrected to a new template matching position associated with the maximum edge density in a predetermined range (expanded partial image) in the neighborhood of the template matching position associated with the maximum degree of coincidence of the image signal, the image at the newly corrected matching position is updated as a template, the direction of the target object is detected based on the newly corrected matching position, the direction of the view field of the imaging unit is adjusted through the pan and tilt head control interface from the direction thus obtained, and thereby the object intruding into the imaging field of the imaging unit is tracked.

As explained above, the conventional intruding object tracking method using the template matching described above also has another disadvantage that an object cannot be accurately tracked in the case where another object passes the front of a target object in relative motion.

Accordingly, another object of the invention is to provide a method and an apparatus for tracking an object high in reliability, in which the disadvantages of the prior art described above are obviated and an object can be accurately detected and tracked even in the case where another object passes the front of the target object.

In order to achieve this object, according to one aspect of the invention, there is provided an object tracking method used with an object tracking apparatus in which a predetermined number of template images are registered, an object in the imaging field is automatically detected by template matching based on the predetermined number of the template images and the detected object is automatically tracked, the method comprising the steps of registering the images of a detected object as template images, detecting the position of an image associated with the maximum degree of coincidence between an input image signal and any one of the predetermined number of registered template images, determining the detected image position by template matching as the position of the object tracked, and updating the template image based on the detected position, thereby tracking an object in the imaging field.

According to another aspect of the invention, there is provided an object tracking apparatus comprising an imaging unit for imaging the monitor range for detecting and tracking an object in the imaging field, an image input interface for converting the video signals acquired by the imaging unit sequentially into an image signal, and an image processor for processing the image signal converted by the image input interface, wherein the image processor conducts the template matching between a predetermined number of templates and the image signals sequentially input from the imaging unit, the template matching position is corrected by determining the template matching position associated with the maximum degree of coincidence obtained by template matching as a new template matching position, the image at the newly corrected matching position is updated as a template, and the direction of the target object is detected from the newly corrected matching position, thereby tracking an object intruding into the imaging field of the imaging unit.

Further, an object tracking apparatus according to an embodiment of the invention comprises a pan and tilt head for changing the direction of the view field of the imaging unit, and a pan and tilt head control interface connected to the image processor for supplying a control signal for controlling the pan and tilt head, wherein the direction of the view field of the imaging unit is adjusted through the pan and tilt head control interface toward the direction detected by the image processor thereby to track an object intruding into the view field of the imaging unit.

Further objects, features and merits of the present invention appear from the following detailed description of a few embodiments of the invention, and from the appended claims as well as the drawings.

DESCRIPTION OF THE EMBODIMENTS

In the case where a target object is tracked using the template matching, a template image or picture template is normally sequentially updated using the image of the position of the target object detected by the matching processing in order to follow the change of the position of the target object. Before explaining the embodiment, these processes will be explained with reference to FIGS. 4 to 7. For the sake of simplicity of explanation, FIGS. 4 to 7 include no processing for template position correction or compensation according to the invention.

Figure 4:
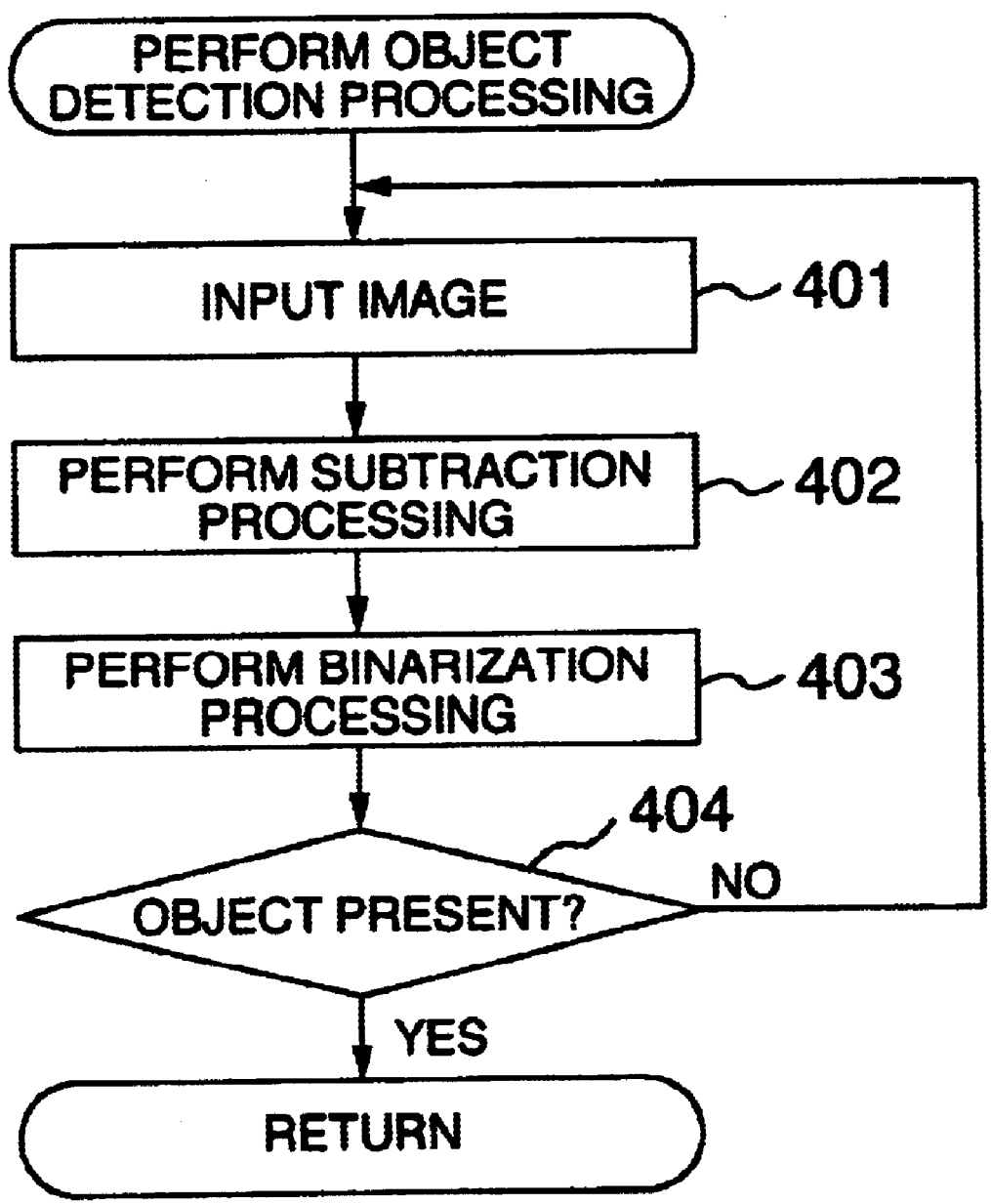
FIG. 4 is a flowchart showing an example of the object detection processing according to the subtraction method.
Figure 5:
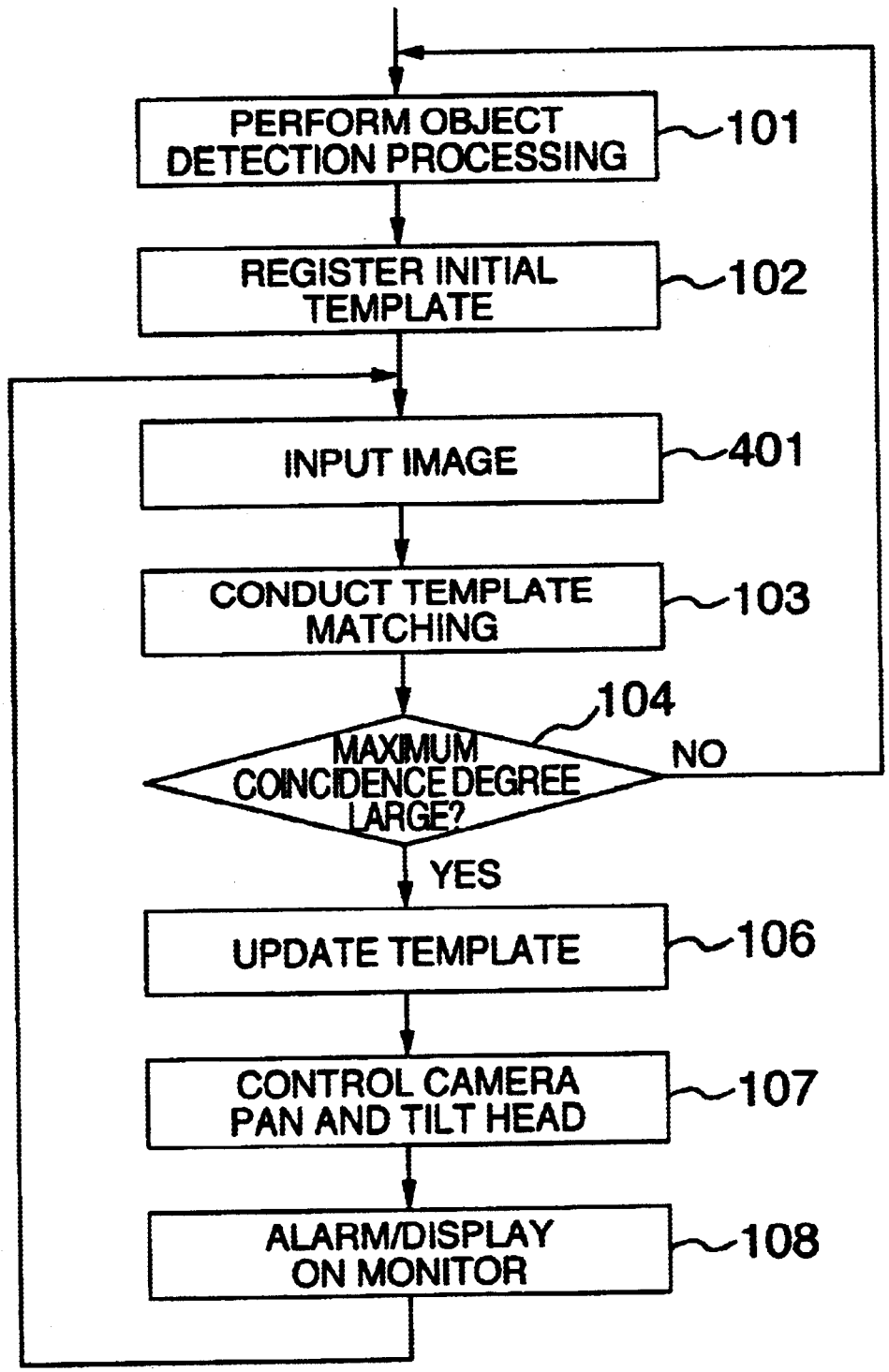
FIG. 5 is a flowchart showing an example of the object tracking processing according to the template matching method.
Figure 6:
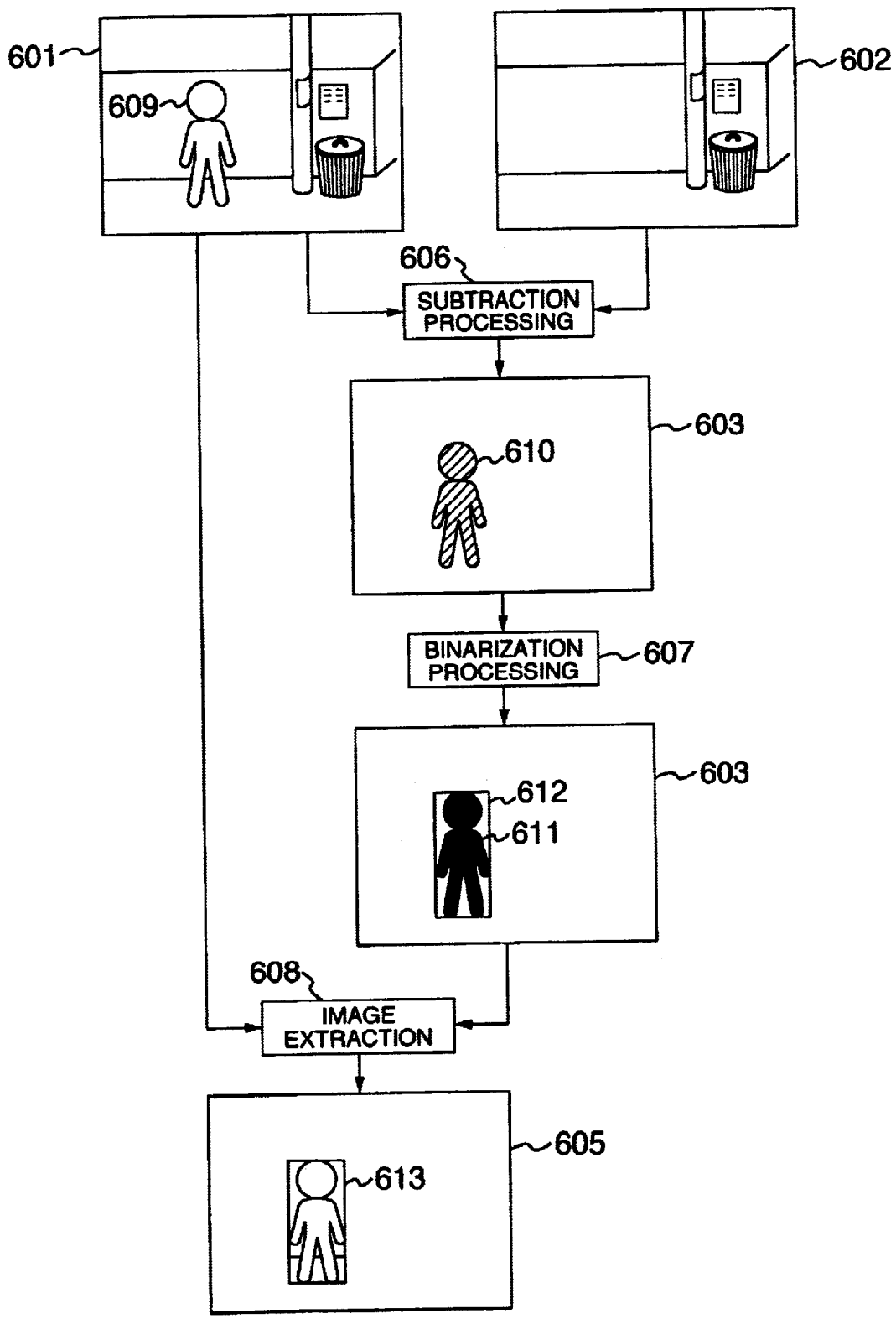
FIG. 6 is a diagram useful for explaining the operation of object detection according to the subtraction method described in FIG. 4.
Figure 7:
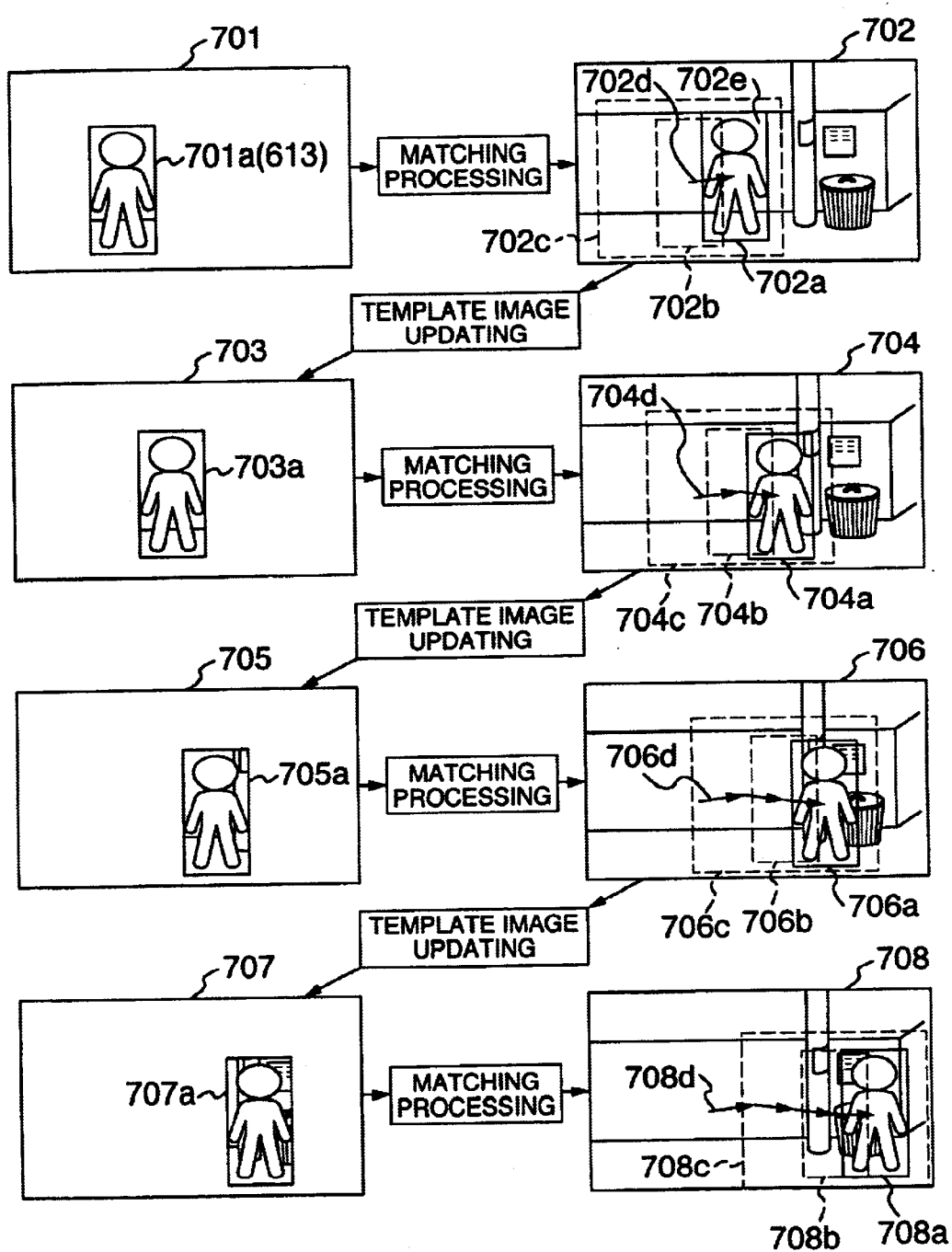
FIG. 7 is a diagram useful for explaining the operation of the object tracking process according to the template matching method described in FIG. 5.

FIG. 4 is a flowchart showing an example of the intruding object detecting process using the subtraction method, FIG. 5 a flow chart showing an example of the intruding object tracking process using the template matching, and FIG. 6 is a diagram for explaining the flow of the intruding object detecting process and the subsequent initial template image registering process shown in FIGS. 4 and 5 with reference to an example of the image. FIG. 7 is a diagram for explaining the flow of the intruding object tracking process shown in FIG. 5 using an example of the image. This last diagram is for explaining the manner in which the images input at predetermined time intervals are processed based on the template image acquired in initial stage (the manner in which the initial template image is changed).

In FIG. 6, numeral 601 designates an input image, numeral 609 a man-like object in the input image 601, numeral 602 a reference background image, numeral 606 a difference processing unit, numeral 603 a difference image obtained after the subtraction processing in the subtraction processing unit 606, numeral 610 a man-like difference image in the difference image 603 corresponding to the man-like object 609, numeral 607 a binarization processing unit, numeral 604 a binarized image of the difference image 603 binarized by the binarizing processing unit 607, numeral 611 a man-like object (man-like binarized image) in the binarized image 604 corresponding to the man-like difference image 610, numeral 612 a circumscribed rectangle of the man-like binarized image 611, numeral 608 an image extraction unit, numeral 605 an image for explaining that the area surrounded by the circumscribed rectangle 612 is taken out from the input image 601 as a template image, and numeral 613 a template image taken out from the input image 601.

In FIGS. 4 and 6, first, the input image 601 of 320×240 pixels is input from a TV camera (image input step 401). Then, in the subtraction processing unit 606, the difference between the input image 601 and the reference background image 602 prepared in advance is calculated for each pixel thereby to acquire the difference image 603. At the same time, the man-like object 609 in the input image 601 appears in the difference image 603 as a difference image 610 (subtraction processing step 402). In the binarizing processing unit 607, the value of the pixels of the difference image 603 having the difference value not more than a predetermined threshold is set to "0", while the value of the pixels not less than the threshold is set to "255" (assuming that one pixel includes 8 bits) thereby to obtain the binarized image 604. In the process, the man-like object 609 picked up in the input image 601 is detected as a man-like object 611 in the binarized image 604 thereby to generate a circumscribed rectangle 613 (binarizing processing step 403) of the man-like object 611.

Then, in the object presence determining step 404, the image extraction unit 608 detects a cluster of the pixels of which the pixel value is "255" in the binarized image 604, and in the presence of a cluster of pixels having the pixel value of "255", the object detection processing is terminated, and the partial image of the input image corresponding to the circumscribed rectangle of the existing cluster is registered in the image memory (to be described later) as a new template image 613. In the absence of such pixels, on the other hand, the process branches to the image input step 401.

The flow of the object tracking processing is explained with reference to FIG. 5. First, the explanation is made with reference to FIG. 7 of the processes subsequent to the processing of object detection and the registration of an initial template image in the steps 101 and 102 of FIG. 5 as explained with reference to FIGS. 4 and 6.

In FIG. 7, numeral 701a designates a template image of an object updated at time point t0−1, numeral 701 a view showing the position of the template image 701a in the input image at time point t0−1, numeral 702 an input image at time point t0, numeral 702a the position of the object (template image) detected by the template matching process at time point t0, numeral 702b the position of the template image of the immediately preceding frame at time point t0−1, numeral 702c a range searched in the template matching process (flowchart of FIG. 5, for example), numeral 702d an arrow indicating the direction and traces of the movement of the man-like object from time point t0−1 to t0 (for example, an arrow going from the center position of 701a toward the center position of 702a), numeral 702e the position where the man-like object is detected by template matching, numeral 703a is a template image updated at time point t0, numeral 703 an view showing the position of the template image 703a in the input image at time point t0, numeral 704 an input image at time point t0+1, numeral 704a the position of the object (template image) detected by template matching at time point t0+1, numeral 704b the position of the template image of the immediately preceding frame at time point t0, numeral 704c the range searched in the template matching process, numeral 704d arrows indicating the direction and traces of the movement of the man-like object from time point t0−1 to t0+1 (for example an arrow going from the 701a center position toward the 704a center position via the 703a center position), numeral 705a a template image updated at time point t0+1, numeral 705 a view showing the position of the template image 705a in the input image at time point t0+1, numeral 706 an input image at time point t0+2, numeral 706a the position of the object (template image) detected by the template matching process at time point t0+2, numeral 706b the position of the template image in the immediately preceding frame (t0+1), numeral 706c a range searched by the template matching process, numeral 706d arrows indicating the direction and traces of movement of the man-like object from time point t0−1 to t0+2 (for example, an arrow going from the 701a center position toward 706a center position via the 703a center position and 705a center position), numeral 707a a template image updated at time point t0+2, numeral 707 a view showing the position of the template image 707a in the input image at time point t0+2, numeral 708 an input image at time point t0+3, numeral 708a the position of the object (template image) detected by template matching at time point t0+3, numeral 708b the position of the template image in the immediately preceding frame at time point t0+2, numeral 708c the range searched in the template matching processing, and numeral 708d is arrows indicating the direction and traces of movement of the man-like object from time t0−1 to t0+3 (for example, an arrow going from the 701a center position toward the 708a center position via the center positions of 703a, 705a and 707a).

Specifically, in FIGS. 5, 6 and 7, the object tracking processing is started, it is determined that an object exists in the binarized image 604 and then the object detection processing 101 is terminated (object detection step 101 (flowchart of object detection processing in FIG. 4)). Then the partial image of the input image 601 corresponding to a circumscribed rectangle of a cluster of a man-like binarized image in the binarized image 604 is registered in the image memory 305 (FIG. 3) as a newly acquired template image 613 (template image 701a in FIG. 7) (initial template registration step 102). Then, in the image input step 401, the partial image 702a associated with the maximum degree of coincidence r(Δx,Δy) with the template image 701a is detected in the search range 702c of the input images sequentially input (template matching step 103).

In other words, the maximum degree of coincidence and the position associated with the maximum degree of coincidence are obtained in the template matching step 103.

As a method of calculating this coincidence degree r(Δx, Δy), the index called the normalized correlation obtained from equation (1) below can be used, for example.

$$r(\Delta x, \Delta y) = \frac{\sum_{i,j \in D_t} (f(x_0 + i, y_0 + j) - \overline{f})(f_t(x_0 + \Delta x + i, y_0 + \Delta y + j) - \overline{f_t(\Delta x, \Delta y)})}{\sqrt{\sum_{i,j \in D_t} (f(x_0 + i, y_0 + j) - \overline{f})^2} \sqrt{\sum_{i,j \in D_t} (f_t(x_0 + \Delta x + i, y_0 + \Delta y + j) - \overline{f_t(\Delta x, \Delta y)})^2}}$$

where, $$\overline{f} = \frac{1}{|D_t|} \sum_{i,j \in D_t} \left( f(x_0 + i, y_0 + j) \right) \quad (1)$$

$$\overline{f_t(\Delta x, \Delta y)} = \frac{1}{|D_t|} \sum_{i,j \in D_t} (f_t(x_0 + \Delta x + i, y_0 + \Delta y + j))$$

In the case where the template matching is conducted with respect to the input image 702, $f_t(x, y)$ designates the input image 702, $f_t(x, y)$ the template image 701a, (x, y) is the coordinate indicating the pixel portion, x-axis is a horizontal direction, y-axis is a vertical direction, (xo, yo) is the upper left coordinate (in the image with the origin located at the upper left) of the registered template image 701a, $\Delta x$ is an axis of abscissas of the search range, $\Delta y$ is an axis of ordinates of the search range, and $D_t$ designates the search range 702c of the template matching process. In the case where an image having exactly the same pixel value as the template image 701a exists in the search range 702c, the coincidence degree $r(\Delta x, \Delta y)$ is given as 1.0. In the template matching step 103, the index expressed by equation (1) is calculated for the search range 702c indicated by $(\Delta x, \Delta y) \in D$, in which the position (circumscribed rectangle) 702a associated with the maximum coincidence degree $r(\Delta x, \Delta y)$ is detected. This search range 702c is determined by the apparent amount of movement of the target object. For example, assume that an object moving at the rate of 40 km/h is monitored by a TV camera (CCD of element size 6.5 mm×4.8 mm, lens of focal length 25 mm, input image size 320×240 pixels, processing intervals 0.1 frame/sec) located 50 m away. The apparent amount of movement of the object is given as 27.4 pix/frame for horizontal direction and 27.8 pix/frame for vertical direction. Thus, D can be set at about a value satisfying the relations $-30$ pix$<\Delta x<30$ pix, $-30$ pix$<\Delta y<30$ pix.

The method of calculating the coincidence degree is not limited to the aforementioned index of normalization correlation. Instead, the difference of the pixel value may be determined for each pixel between the input image and the template image, for example, and the reciprocal of the accumulated value of the absolute values of the particular difference may be determined as the coincidence degree.

After it is determined in the template matching step 103 that the object has moved to the position in the input image 702 associated with the maximum coincidence degree with the template image 701a (from the circumscribed rectangle 702b to the circumscribed rectangle 702a), assume that the maximum coincidence degree has decreased to a predetermined value or less (for example, less than 0.5). Then, the maximum coincidence degree determining step 104 determines that the target object has disappeared from the input image, and the process branches to the object detection processing step 101. In the case where the maximum coincidence degree is not less than the predetermined value (not less than, for example, 0.5), on the other hand, the process branches to the template update step 106.

In the template update step 106, the template image 701a is updated to the template image 703a using the partial image 702a having the maximum degree $r(\Delta x, \Delta y)$ of coincidence with the template image 701a in the search range 702c of the input image 702. The template image is updated by reason of the fact that if the posture of the target object changes (for example, the image changes as the man constituting the target object raises his hand, bends himself or raises his leg) and the template image is not updated, the coincidence degree would decrease for a reduced reliability of the tracking result. For this reason, the template image is updated with the partial image 702e of the detected target object as a new template image 703a, so that a stable tracking is secured even in the case where the target object changes his posture.

Then the process proceeds to step 107 for controlling the pan and tilt head of the camera.

Figure 11:
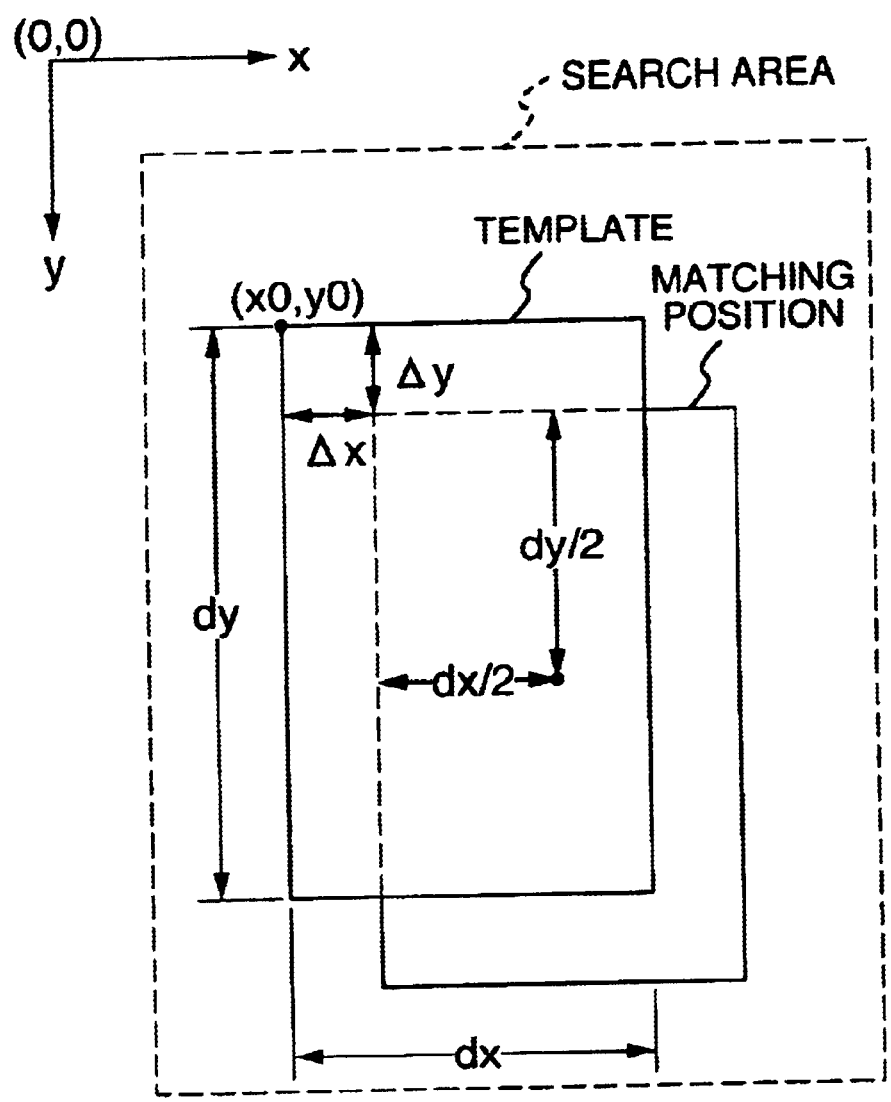
FIG. 11 is a diagram useful for explaining the template matching process according to the embodiment of FIG. 1.

FIG. 11 is a diagram for explaining the relation between the image (monitor screen) and the position of the target object detected by template matching. With reference to FIG. 11, step 107 for controlling the pan and tilt head of the camera will be explained.

In the pan and tilt head control step 107, the pan and tilt motor of the camera pan and tilt head 302 is controlled based on the displacement between the image center and the position of the target object detected by template matching, i.e. the direction of the target object with respect to the optical axis of the camera. Specifically, the center position (x0+$\Delta$x+dx/2, y0+$\Delta$y+dy/2) ((dx,dy) indicates the size of the template) of the target object detected by template matching is compared with the center position (160, 120) of the image (assuming that the image size is 320×240), and in the case where the center position of the target object detected is located to the left of the center position of the image, the pan motor of the camera pan and tilt head is controlled to move the optical axis of the camera leftward, while in the case where the center position of the target objected is located to the right of the center position of the image, on the other hand, the pan motor of the camera pan and tilt head is controlled to move the optical axis of the camera rightward. Also, in the case where the center position of the target object detected is located above the center position of the image, the tilt motor of the camera pan and tilt head is controlled to move the optical axis of the camera upward, while in the case where the center position of the target object detected is located below the center position of the image, the tilt motor of the camera pan and tilt head is controlled to move the optical axis of the camera downward. The pan motor and the tilt motor can be controlled at the same time. In the case where the center position of the target object detected is located to the left above the center position of the image, for example, the tilt motor of the camera pan and tilt head is controlled to move the optical axis of the camera leftward while at the same time controlling the pan motor to move the optical axis of the camera upward. By doing so, the camera pan and tilt head can be controlled in such a manner as to hold the target object on the optical axis of the camera.

Then, in the alarm/monitor display step 108, an alarm is issued or the image of the target object is displayed on the monitor in the case where the target object is located in such a range that a predetermined alarm is to be issued.

Upon completion of the alarm/monitor display step 108, the process is returned to the image input step 401, where a new input image is acquired and the template matching is conducted again. Specifically, the template matching is conducted using the template image 703a updated by the input image 702 at time point t0 and the input image 704 at time point t0+1. By this time, the search range 704c has been moved to the position centered at the template image 704b updated at time point t0, and the new search range is searched. An object associated with the maximum coincidence degree is detected, and a new template image 705a is generated based on the position 704a of the object thus detected.

As described above, as long as a target object exists, the process of steps 401, 103, 104, 106, 107 and 108 are repeated, so that the template image is updated to the new template images 706a, 708a and so on, thus continuing to track the target object.

In the object tracking method according to the invention, in order to solve the aforementioned problem that the pattern of the target object apparently moves causing the template position to be displaced, the feature that the target object has more edge components than the background is utilized. In other words, the position of the template image updated during the tracking process is corrected based on the density of the edge image of the input image.

Specifically, according to this invention, an object is detected by the subtraction method, the image of the detected object is held as a template image, and the object is tracked while correcting the detected position of the image of the object to a position associated with the maximum density of the edge image searched over an area consisting of the portion detected by the template matching and a peripheral portion extending around the portion detected by the template matching. In this way, a stable tracking is secured even in the case where the orientation of the target object is changed.

In the above described embodiment, a template image formed with respect to an intruding object detected by the subtraction method is formed such that a circumscribed rectangle of a cluster of pixels detected by the subtraction method is formed and the part of the input image or partial image surrounded by the circumscribed rectangle is cut out as a template image. However, the method of deciding the size of the template image to be cut out is not limited to this method. For example, the size may be determined by multiplying the size of the circumscribed rectangle by a predetermined coefficient such as 0.8, 1.1 or the like. Further, as will be described below, when a CCD is used as the image pickup device, the size of the object regarded as an object to be tracked can be calculated from the size of the CCD, the focal length of the lens used and the distance from the CCD to the detected object and the thus calculated size of the object may be the size of the template image.

More specifically, the apparent vertical size (A) and the apparent horizontal size (B) of the object to be monitored are given as $$A = \frac{f \times H \times X}{T \times L}$$

$$B = \frac{f \times W \times Y}{S \times L}$$

where T is the vertical size in mm of the CCD, S the horizontal size in mm of the CCD, f the focal length in mm of the lens, L the distance in m up to the object, H the minimum height in m of the object, W the minimum width in m of the object, X the vertical image size in the number of pixels in the vertical direction and Y the horizontal image size in the number of pixels in the horizontal direction.

For example, when an object to be tracked 200 m away is to be monitored with an image of 256×192 pixels using a ½-type CCD (6.5 mm (W)×4.8 mm (H)) and a lens having a focal length of 112 mm, the apparent vertical size (A) and the apparent horizontal size (B) are $A=(112\times0.5\times192)/(4.8\times200)=11.2$ pixels $B=(112\times0.5\times256)/(6.5\times200)=11.0$ pixels.

Alternatively, the A and B thus calculated may further be multiplied by 0.8, 1.1 or other coefficient as described above to set the size of the template image. In this way, by excluding objects in the view field that are smaller than the predetermined size, a high precision object tracking becomes possible.

Figure 3:
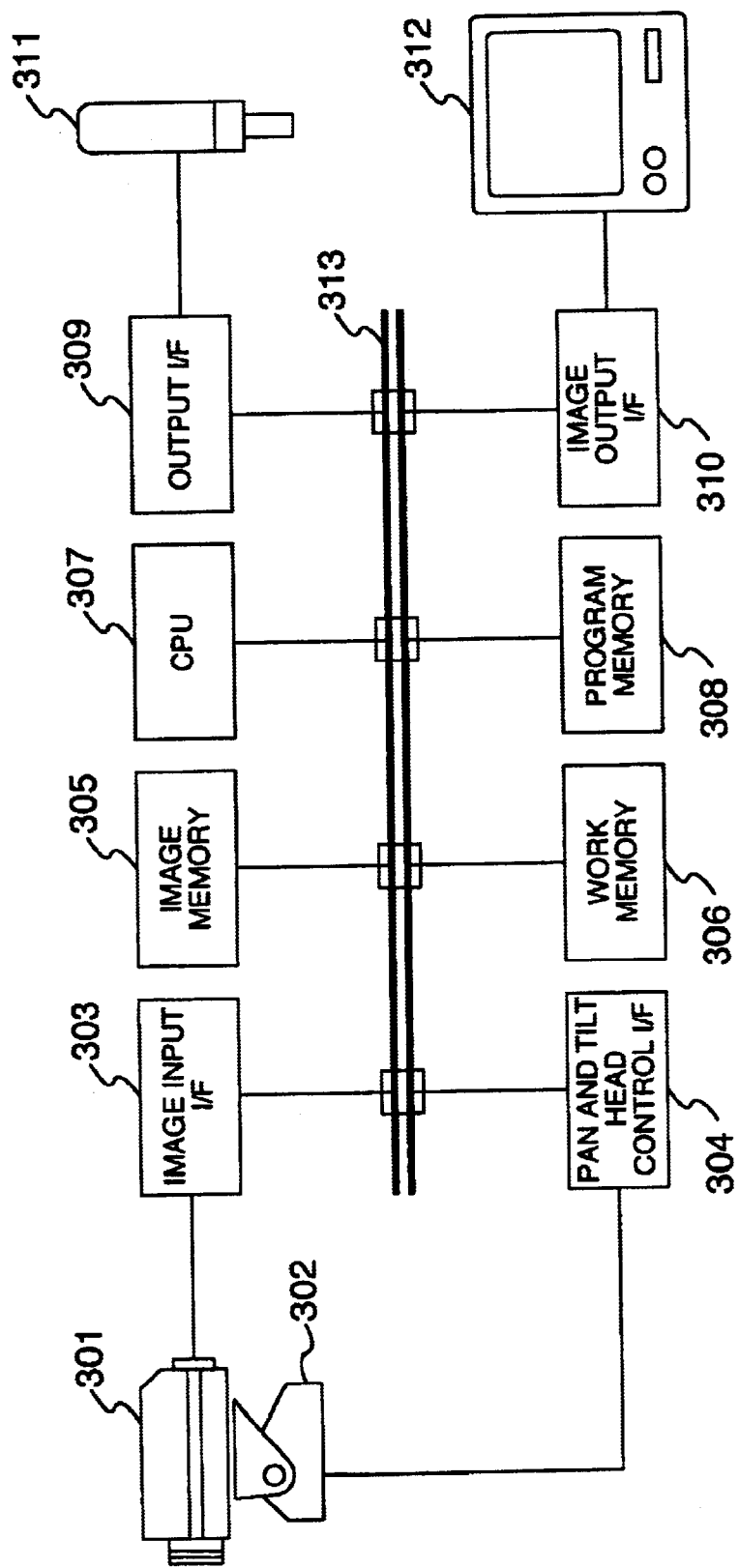
FIG. 3 is a block diagram showing a configuration of a monitor unit according to an embodiment of the invention.

FIG. 3 shows an example hardware configuration of an object tracking apparatus shared by the embodiments of the invention. Numeral 301 designates a TV camera, numeral 303 an image input I/F, numeral 313 a data bus, numeral 305 an image memory, numeral 306 a work memory, numeral 307 a CPU, numeral 308 a program memory, numeral 302 a camera pan and tilt head, numeral 304 a pan and tilt head control I/F, numeral 309 an output I/F, numeral 310 an image output I/F, numeral 311 an alarm lamp, and numeral 312 a monitor. The TV camera 301 is connected to the image input I/F 303, the camera pan and tilt head 302 is connected to the pan and tilt head control I/F 304, the alarm lamp 311 is connected to the output I/F 309, and the monitor 312 is connected to the image output I/F 310. The image input I/F 303, the pan and tilt head control I/F 304, the image memory 305, the work memory 306, the CPU 307, the program memory 308, the output I/F 309 and the image output I/F 310 are connected to the data bus 313. Also, the TV camera 301 is mounted on the camera pan and tilt head 302.

In FIG. 3, the TV camera 301 picks up an image of an object monitored (within the range of view field). The video signal thus picked up is accumulated in the image memory 305 through the data bus 313 from the image input I/F 303. The CPU 307 analyzes the images accumulated in the image memory 305 in the work memory 306 in accordance with the program stored in the program memory 308. The CPU 307 changes the imaging field of the TV camera 301 by controlling the camera pan and tilt head 302 through the pan and tilt head control I/F 304 from the data bus 313 in accordance with the processing result or turns on the alarm lamp 311 through the output I/F 309 while at the same time displaying the image of the result of detecting an intruding object, for example, on the monitor 312 through the image output I/F 310. The image memory 305 also constitutes a template image holding unit for keeping the template images in registration.

All the flowcharts used for explanation hereinbelow are based on the hardware configuration of the object tracking apparatus described with reference to FIG. 3.

A first embodiment of the invention will be explained with reference to FIG. 1.

Figure 1:
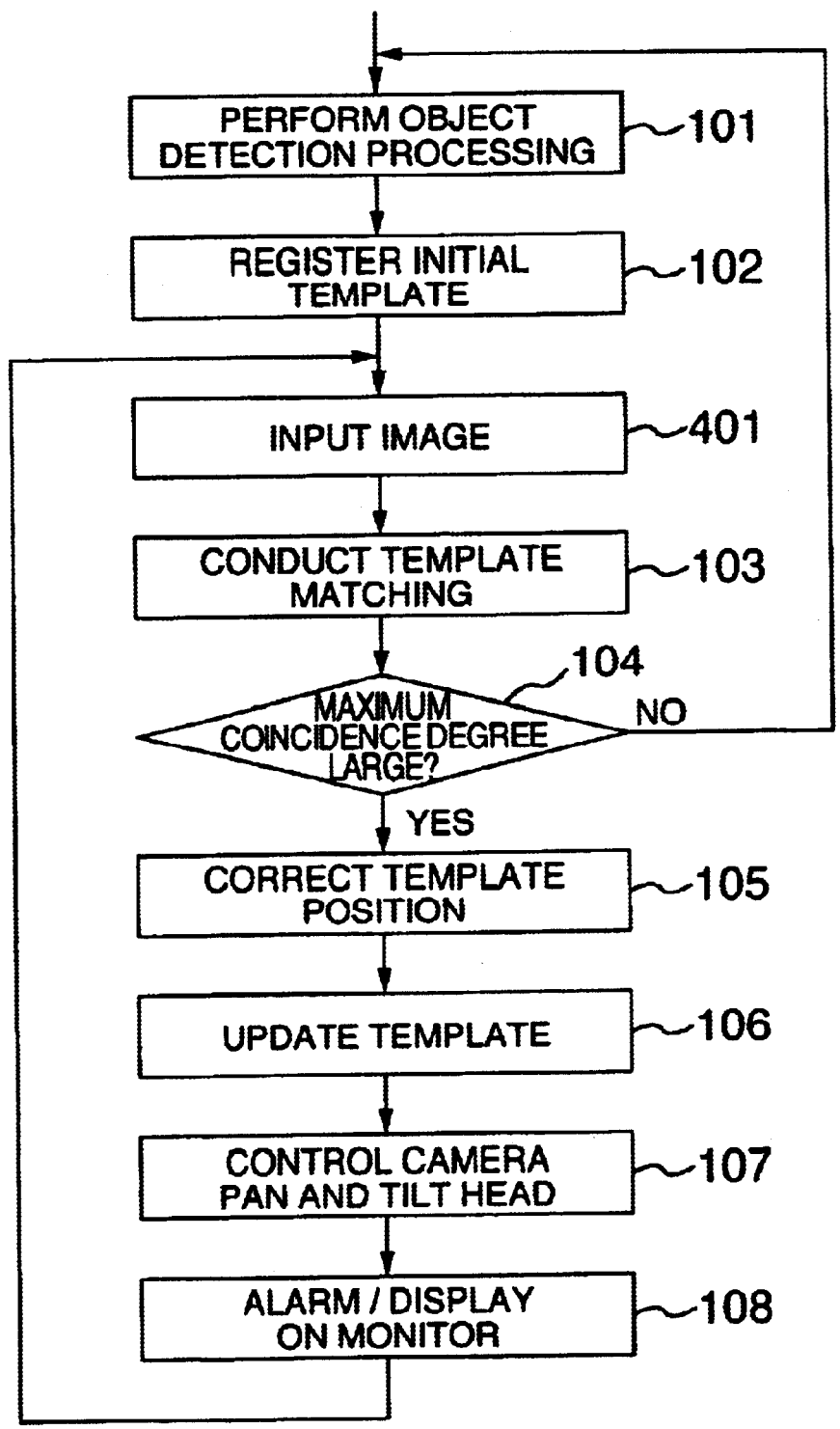
FIG. 1 is a flowchart for explaining the processing operation according to an embodiment of the invention.

FIG. 1 is a flowchart for explaining the processes according to an embodiment of the invention. In FIG. 1, a template position correction step 105 is added to the processes of the template matching method shown in FIG. 5. Steps 101, 102, 401, 103, 104, 106, 107, 108, which are identical to the corresponding steps shown in FIGS. 4 and 5, will not be described.

In step 104 for determining the maximum coincidence degree, assume that the maximum coincidence degree is not less than a predetermined value. The process proceeds to step 105 for correcting or compensating for the template position. The contents of the process in the template position correction step 105 will be explained with reference to FIGS. 9A to 9E and the input image 804 obtained at time point t1+1 in FIG. 8.

Figure 8:
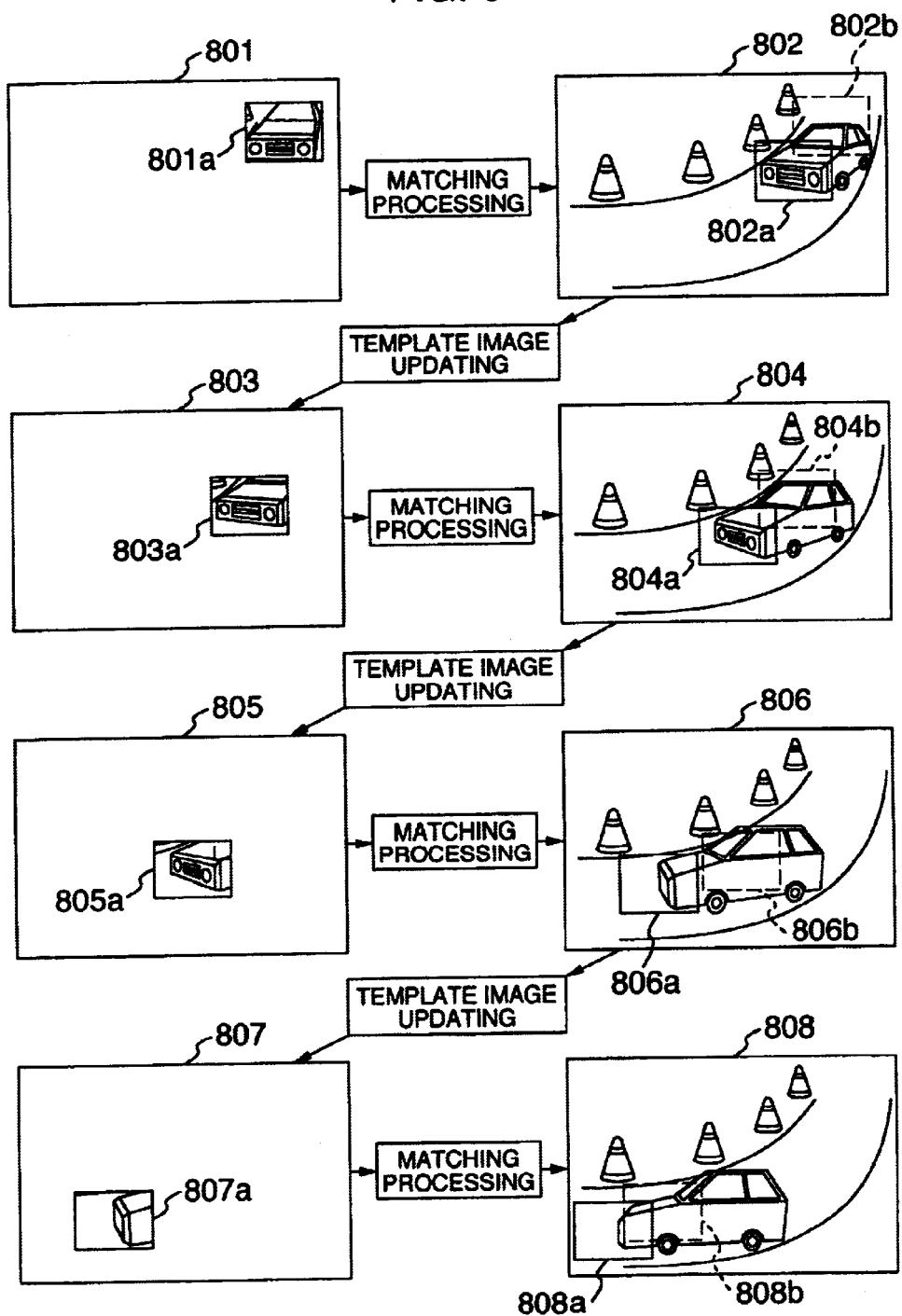
FIG. 8 is a diagram useful for explaining the operation of the object tracking process according to the template matching method described in FIGS. 5 and 7.
Figure 9A:
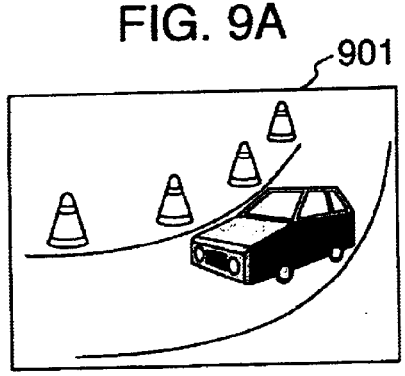
FIGS. 9A to 9E are diagrams useful for explaining the object tracking method according to the embodiment shown in FIG. 1.
Figure 9B:
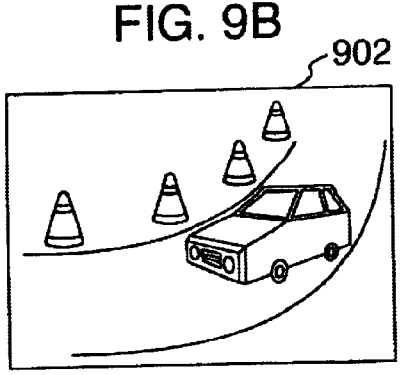
Figure 9C:
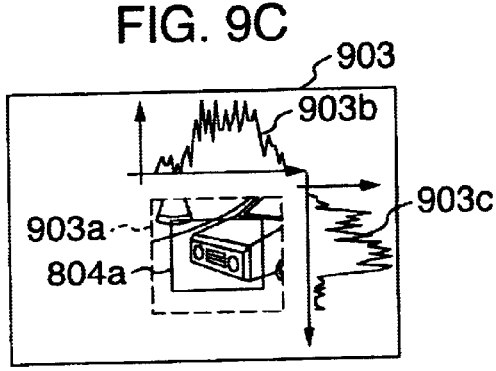
Figure 9D:
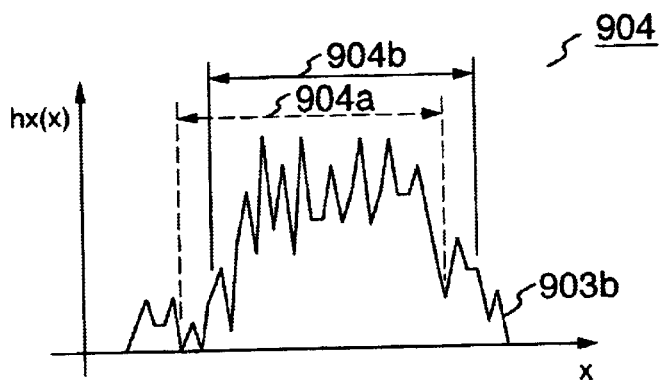
Figure 9E:
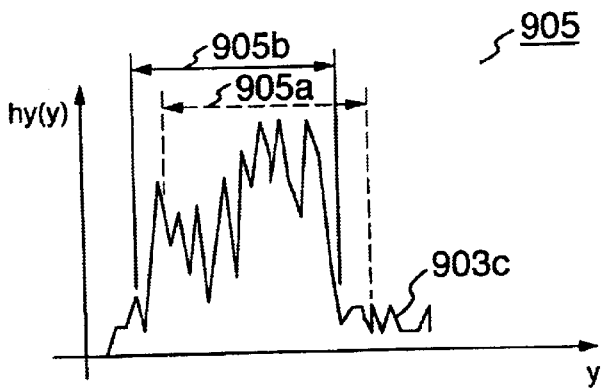

FIGS. 9A to 9E show as an intruding object a vehicle running along a curved lane in the imaging field for explaining the flow of the intruding object tracking process with reference to an example image, and represent an example of processing the input image 804 in FIG. 8. In FIG. 9A, numeral 901 designates an input image (shading image) identical to the input image 804 of FIG. 8. In FIG. 9B, numeral 902 designates an edge image extracted from the input shading image 901 using a differential filter not shown. In FIG. 9C, numeral 903a designates a search area, numeral 903b an image projected in horizontal direction (along x axis), numeral 903c an image projected in vertical direction (along y axis), numeral 903 a view displaying, by way of explanation, the projected images 903b and 903c superposed on the edge image cut out from the area 903a, and numeral 804a a range indicating the detected position obtained by template matching shown in FIG. 8. In FIG. 9D, numeral 904 designates a graph indicating an x-axis projected image 903b, numeral 904a a range indicated by the detected position obtained by template matching, and numeral 904b a range associated with a maximum accumulated projection value. In FIG. 9E, numeral 905 designates a graph showing a y-axis projected image 903c, numeral 905a a range indicating the detected position obtained by template matching, and numeral 905b a range associated with a maximum accumulated projection value.

In FIGS. 9A to 9E, the edge extraction processing is executed for the input image 901 thereby to obtain an edge image 902 in the template position correction step 105. This edge extraction processing is performed by applying the input image 901, for example, through a differential filter such as Sobel's or Roberts' and binarizing the resulting image (by setting the edge portion to "255" and the other portions to "0"). An example of this processing is described in "Introduction to Computer Image Processing" edited by Hideyuki Tamura, p. 118–125, published by Soken Shuppan, 1985.

Then, from the edge image 902, the search area 903a (defined by dotted frame in the view 903, i.e. upper left coordinate (x0-d, y0-d), size (dx+2d, dy+2d)) is cut out, which is the result of expanding the range of the detected position 804a obtained in the template matching step 103 by a predetermined pixel amount d (d: tolerable displacement of the matching position with the change in the orientation of the target object) in four directions, thereby producing the projected image 903b of the edge image on the x axis and the projected image 904c of the edge image on the y axis. Therefore, the search area 903a is an expanded partial image including the range of the detected position 804a.

In the graph 904, the abscissa represents the horizontal direction (x axis), and the ordinate the value hx(x) of the projected image 903b of the edge image for each pixel (pix) along the horizontal (x axis) direction. In the graph 905, on the other hand, the abscissa represents the vertical (y axis) direction, and the ordinate the value hy(y) of the projected image 903c of the edge image for each pixel (pix) along the vertical (y axis) direction.

The projection value x(x0) of the projected image 903b along x axis at x=x0 is obtained by changing (x, y) in such a manner that y0−d<y<y0+dy+d at x=x0 in the edge image cut out as the search area 903a and counting the number of pixels corresponding to the pixel value of "255". Also, the projection value y(y0) of the projected image 903c at y=y0 along y axis is obtained by changing (x, y) in such a manner that x0−d<x<x0+dx+d at y=y0 in the edge image cut out as the search area 903a, and counting the number of pixels corresponding to the pixel value of "255". The range 904b is the range (x1<x<x1+dx) associated with the maximum accumulated projection value, i.e. the maximum edge density, and this position is obtained from the following equation (2).

$$x_1 = arg\ max_{x_0-d<x_1<x_0+d} \left( \sum_{i=0}^{dx} hx(x_1 + i) \right) \qquad (2)$$

This equation (2) is to determine x1 associated with the maximum accumulated value of hx(x) in the relation x1<x<x1+dx for x changed so that x0−d<x1<x0+d. In similar fashion, the range (y1<y<y1+dy) associated with the maximum accumulated edge value is obtained for the projected image on y axis. Thus, the position (upper left coordinate (x0, y0)) of the target object detected in the template matching step 103 is changed to the position (upper left coordinate (x1, x1)) corrected in the template position correction step 105.

Figure 10:
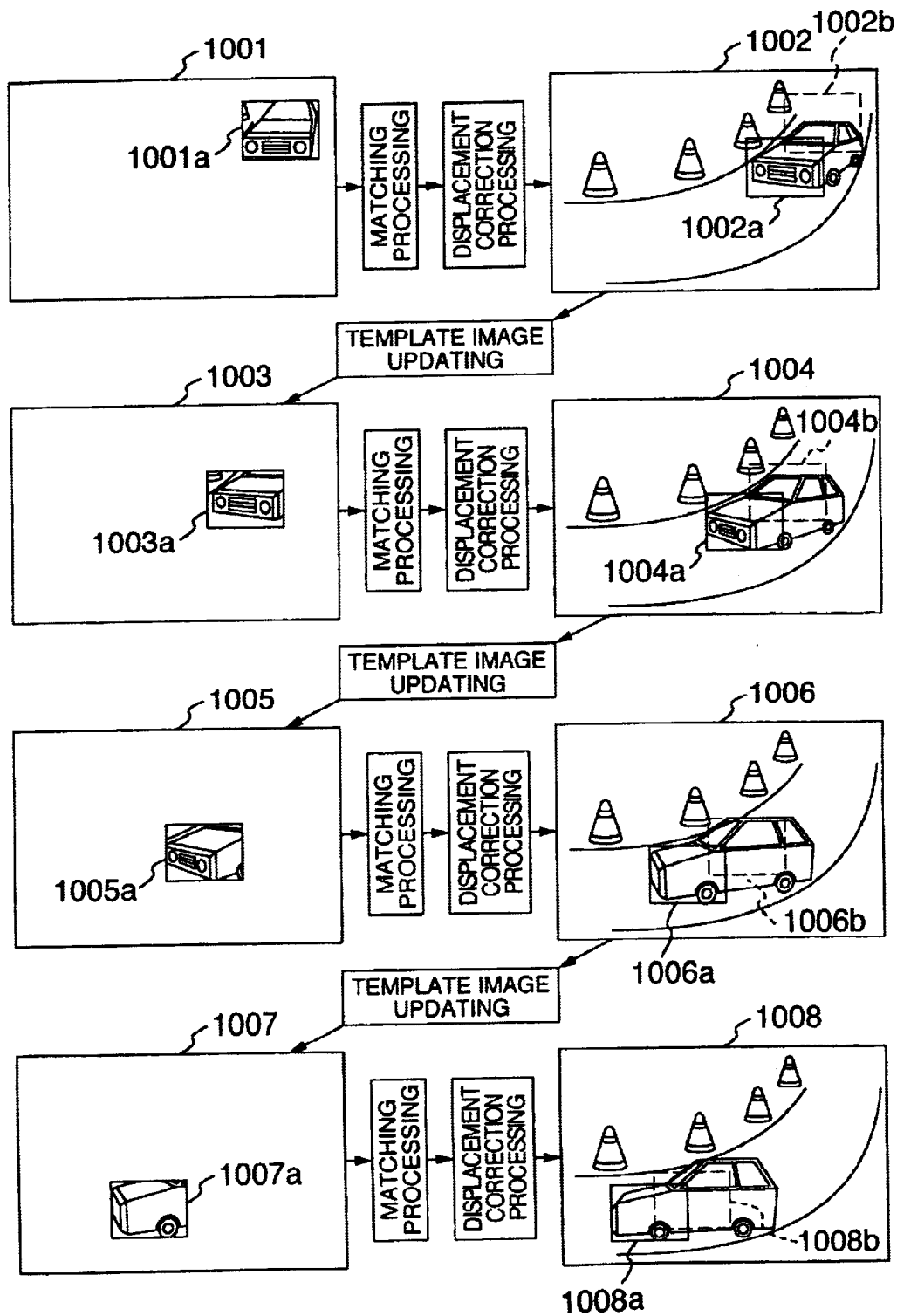
FIG. 10 is a diagram useful for explaining the operation and the effect of the object tracking method according to the embodiment of FIG. 1.

The effect of the aforementioned embodiment will be explained with reference to FIG. 10. FIG. 10 is a diagram for explaining the flow of the intruding object tracking processing using an image example on the assumption that an intruding object is a vehicle running in a curved lane within the imaging field under the same conditions as in FIG. 8. However, the displacement correction process is added after the matching process shown in FIG. 8. Numerals 1001a, 1003a, 1005a, 1007a designate the template images at time points t1−1, t1, t1+1, t1+2, respectively; numerals 1001, 1003,1005, 1007 designate views designating the positions of the template images 1001a, 1003a, 1005a, 1007a at the time of updating; numerals 1002,1004, 1006, 1008 designate input images at time points t1, t1+1, t1+2, t1+3, respectively; numerals 1002a, 1004a, 1006a, 1008a designate the positions of the object detected by template matching at time points t1, t1−1, t1+2, t1+3, respectively; and numerals 1002b, 1004b, 1006b, 1008b designate the positions of the template images in the immediately preceding frame (the template images at time points t1−1, t1, t1+1, t1+2, respectively).

In the method shown in FIG. 8, the template matching is conducted in such a manner as to reduce the displacement between the input image involved and the image portion high in contrast (the vehicle front portion in the case of FIG. 8) in the template image. In the situation where the orientation of the target object undergoes a change, therefore, the position of the vehicle front portion in the template image remains unchanged, while the pixels come to be contained in an increasing proportion for the image (background image) other than the target object as the tracking process is repeated.

In the case of FIG. 10 representing an embodiment of the invention, in contrast, the position of the template image is sequentially corrected or compensated to the pixel area containing more edges, i.e. the pixel area of the target object. As compared with the template image in the method of FIG. 8, therefore, the pixels other than the target object are contained in a lesser proportion. Thus, comparison between the template positions such as 809a and 1009a at the same time point in FIGS. 8 and 10 shows that the pixels for the background contained in the template image is one half or more of all for the position 809a, while the greater part of the template image contains the pixels of the target object for the position 1009a.

After the template position correction step 105, the template update step 106 is executed by updating the corrected position of the target object as a new template image. A similar process to that of FIG. 5 is executed subsequently.

As described above, according to this embodiment of the invention, the position detected in the template matching step 103 is corrected to the position associated with the maximum edge density by detecting the edges included in the target object. Even in the case where the target object changes the orientation thereof, therefore, the position of the template is not displaced from the target object and the target object can be accurately tracked.

Figure 2:
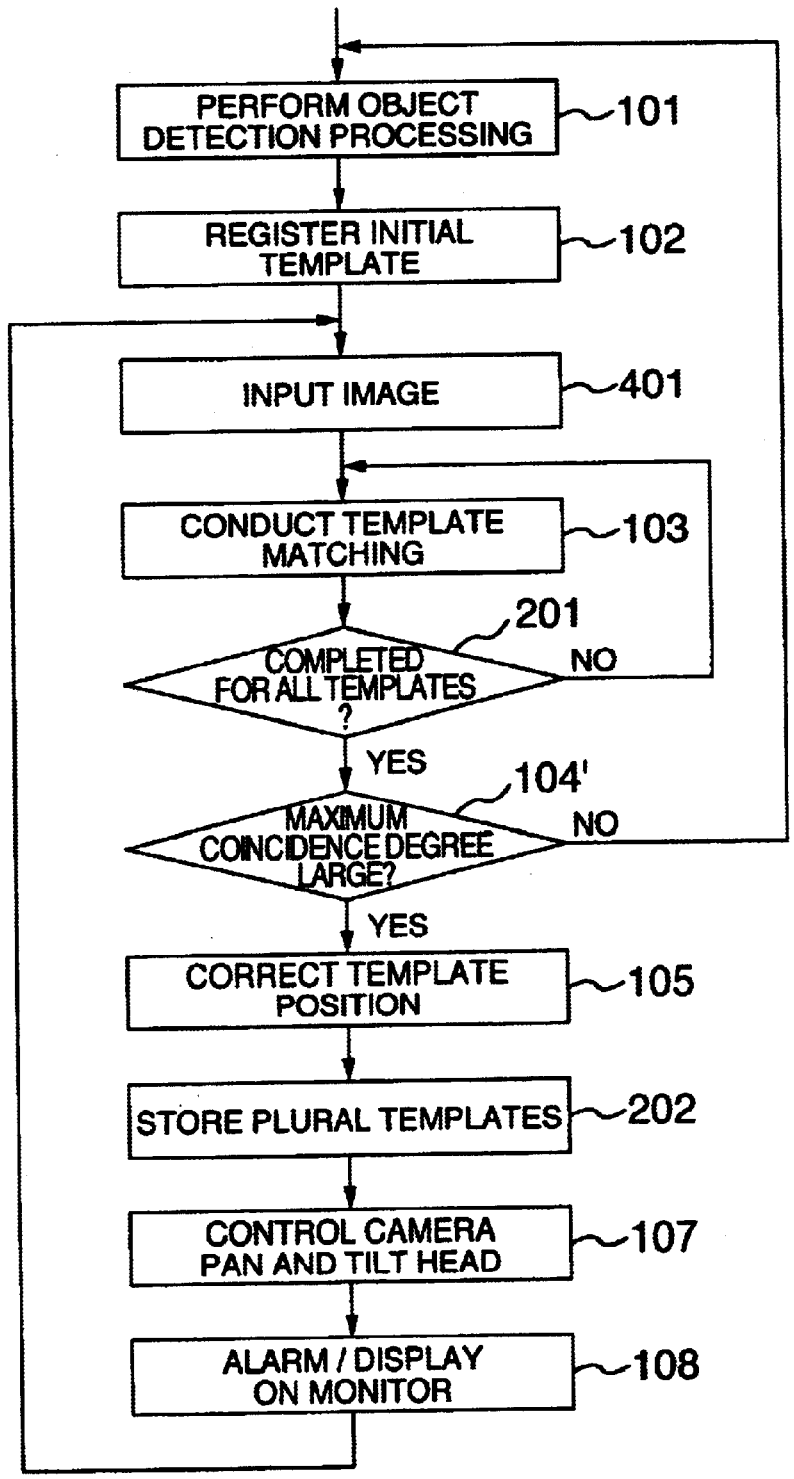
FIG. 2 is a flowchart for explaining the processing operation according to another embodiment of the invention.

A second embodiment of the invention will be explained with reference to FIG. 2. FIG. 2 is a flowchart showing the processing steps embodying the invention. In FIG. 2, the step 104 for determining the maximum coincidence degree in the flowchart of the first embodiment shown in FIG. 1 is replaced by a branching step 201 and a maximum coincidence degree determining step 104', and the template update step 106 is replaced by step 202 for storing a plurality of templates.

In FIG. 2, once the process is started, the image acquired from the input image at time point t0-1 is registered as a template image for time point t0-1 in the initial template registration step 102 following the object detection step 101 described above. Then, the process proceeds to the image input step 401, where the input image at time point t0 is acquired.

After that, in the template matching step 103, the stored template image at time point t0-1 is matched with the input image at time point t0. Through the branching step 201 (described later), the process proceeds to the maximum coincidence degree determining step 104'.

In the case where the maximum coincidence degree is not less than a predetermined value in the maximum coincidence degree determining step 104', the process proceeds to the template position correction step 105, while in the case where the maximum coincidence degree is less than a predetermined value, the process returns to the object detection processing step 101.

In the template position correction step 105, the position extracted in the maximum coincidence degree determining step 104' is corrected as a detected position for time point t0. In the next step 202 for storing a plurality of templates, the template at time point t0 is newly stored based on the corrected detected position for time point t0. At the same time, the template image at time point t0-1 already registered in the initial template registration step 102 is stored as it is. Then, the process proceeds to the camera pan and tilt head control step, where the view field of the camera is directed toward the target object based on the corrected detected position for time point t0.

Then, the process proceeds to the alarm/monitor display step 107 for sounding an alarm or displaying the image of the target object on the monitor.

Upon completion of the alarm/monitor display step 107, the process returns to the image input step 401 where a new input image is acquired and the template matching is conducted again.

When the process is returned to the template matching step 103, there are stored two templates including the one at time point t0-2 and the other at time point t0-1 ("-1" is added since the time is advanced by "1"). In the template matching step 103, the input image for time point t0 is matched with the template for time point t0-1, and then the process proceeds to step 201.

In the branch step 201, all the template images in store are checked whether they are subjected to template matching or not. Assume that the template matching for the template at time t0-1 has been completed but the template matching process remains undone for time point t0-2. In that case, the process returns to step 103 for conducting the template matching between the template for time point t0-2 and the template for time point t0. In this way, the remaining templates are matched one by one, and upon complete template matching of all the templates, the process proceeds from the branch step 201 to the maximum coincidence degree determining step 104'.

In the maximum coincidence degree determining step 104', the largest value is selected from the maximum coincidence degrees obtained for a plurality of template images by template matching. In the case where the largest maximum coincidence degree thus selected is not less than a predetermined value (for example, 0.5), the process proceeds to the template position correction step 105, while in the case where the largest value of the maximum coincidence degree is less than a predetermined value, on the other hand, the process returns to the object detection step 103, regarding the target object as nonexistent now in the input image.

In the template position correction step 105, the input image edge processing is performed on the template image associated with the largest value of the maximum coincidence degree selected in the maximum coincidence degree determining step 104', and the position of the target object is corrected based on the edge image obtained.

In the next step 202 for storing a plurality of templates, the template at time point t0 is newly stored based on the corrected detected position for time point t0. At the same time, the template image at time point t0-1 registered in the template registration step 102 is held as it is.

The number of template images stored in the template storage step 202 is predetermined at an arbitrary number (for example, "3"), and when the predetermined number is exceeded, the oldest template acquired is deleted. Then, the process proceeds to the camera pan and tilt head control step for controlling the camera position.

The process further proceeds to the alarm/monitor display step 108 for sounding an alarm or displaying the image of the target object on the monitor, for example.

Upon completion of the alarm/monitor display step 108, the process returns to the image input step 401 to acquire a new input image thereby to continue the template matching process again.

According to this second embodiment, the edges of the target object are detected based on the position detected in the template matching step 103, and the detected position is corrected to the position associated with the maximum edge density. The template images for a predetermined number of frames obtained at different time points are matched independently of each other. Even in the case where the target object changes the orientation (posture) thereof or another object transverses in front of the target object, therefore, the area associated with the maximum coincidence degree is used as the template matching position based on a plurality of the past template images for the purpose of correction. As a result, the template position is not displaced from the target object and the target object can be accurately tracked without tracking another object.

As described above, according to this embodiment, the target object changing the orientation or posture thereof can be stably tracked and thus the monitor used with the imaging unit can find considerably wider applications.

Now, a third embodiment of the invention will be explained with reference to FIGS. 3, 12 and 13.

In the object tracking method according to this embodiment, a plurality of frames of template images used for template matching are held in the process of tracking taking advantage of the feature that the coincidence degree of matching decreases when a plurality of objects pass each other. A plurality of template images obtained at different time points are matched independently of each other, and the target object is tracked based on the template image having the highest degree of coincidence.

Specifically, according to this embodiment, an object is detected by the subtraction method, and the images of the detected object are held in a predetermined number of frames as templates, each of which is matched. The template associated with the maximum coincidence degree and the position thereof are detected, thereby making it possible to stably track the target object even when another object passes in front of the target object.

The example of hardware configuration of the object tracking apparatus shown in FIG. 3 can be used for the object tracking method according to this embodiment.

The flowchart below will be described with reference to the hardware configuration of the object tracking and monitor apparatus shown in FIG. 3. Nevertheless, the invention is not limited to the hardware configuration shown in FIG. 3 but various configurations can of course be used according to the invention.

An embodiment of the invention will be explained with reference to FIG. 12.

Figure 12:
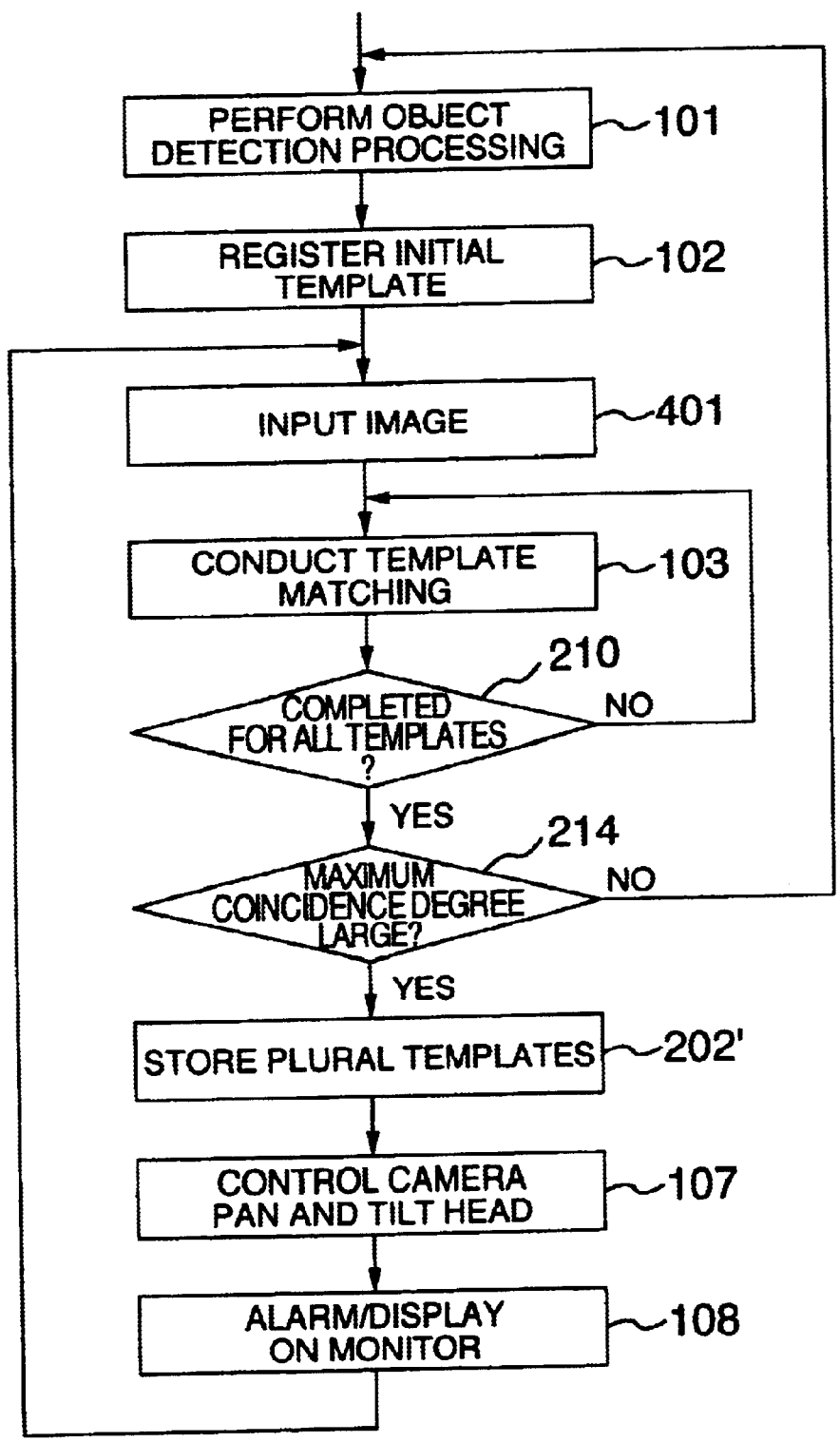
FIG. 12 is a flowchart for explaining the processing operation according to another embodiment of the invention.

FIG. 12 is a flowchart showing an example of the processes according to the invention. In FIG. 12, the process of the template matching method described with reference to FIG. 5 is modified in such a manner that the maximum coincidence degree determining step 104 and the template updating step 106 are replaced by a branching step 210, a maximum coincidence degree determining step 214 and a plural-template storage step 202'. Steps 101, 102, 401, 103, 107, 108 are identical to the corresponding ones shown in FIGS. 4 and 5 and will not be described.

Once the process is started in FIG. 12, the image acquired from the input image at time point t0-1 is registered initially as a template image for time point t0-1 in the initial template registration step 102 following the object detection process 101 described above, and the input image at time point t0 is acquired in the image input step 401, after which the process proceeds to the template matching step 103.

In the template matching step 103, the template matching is conducted between the template image stored at time point t0-1 and the input image for time point t0. Through the branching step 210 (to be described later), the process proceeds to the maximum coincidence degree determining step 214.

In the case where the maximum coincidence degree is not less than a predetermined value in the maximum coincidence degree determining step 214, the process proceeds to the plural-template storage step 202', while in the case where the maximum coincidence degree is less than the predetermined value, the process returns to the object detection step 101.

In the plural-template storage step 202', the template at time point t0 is newly stored based on the detected position of the object detected in the input image for time point t0. In the process, the template image at time point t0-1 already registered in the template registration step 102 is held as it is.

Then, the process proceeds to the camera pan and tilt head control step 107 for directing the view field of the camera 301 toward the target object.

The process proceeds to the alarm/monitor display step 108 for sounding an alarm or displaying the image of the target object on the monitor.

Upon completion of the alarm/monitor display step 108, the process returns to the image input step 401 for acquiring a new input image and conducting the template matching process again.

By the time the process is returned to the template matching step 103, the two templates including the template at time point t0-2 and the template at time point t0-1 are stored ("-1" is added since the time is advanced by "+1"). In the template matching step 103, the input image at time point t0 is matched with the template at time point t0-1 and the process proceeds to the branching step 210.

In the branching step 210, all the template images in store are checked whether they have been subjected to template matching or not. The template at time point t0-1 is subjected to template matching, but the template at time point t0-2 is not yet subjected to template matching. Therefore, the process is returned to step 103, and the template matching is conducted between the template at time point t0-2 and the input image at time point t0. In this way, the remaining templates are subjected to template matching one by one, and upon complete template matching for all the templates, the process proceeds from the branching step 201 to the maximum coincidence degree determining step 214.

In the maximum coincidence degree determining step 214, the largest value is selected from a plurality of maximum coincidence degrees for a plurality of template images. In the case where the maximum coincidence degree of the selected largest value is not less than a predetermined value, the process proceeds to the template position correction step 105, while in the case where the maximum coincidence degree of the largest value is less than the predetermined value, the process returns to the template matching step 103.

In the plural-template storage step 202', the template at time point t0 is newly stored based on the position associated with the largest value of the maximum coincidence degree determined in the maximum coincidence degree determining step 214 among the objects detected in the input image for time point t0.

At the same time, the template image at time point t0-1 already registered in the initial template registration step 102 is kept stored as it is.

The number of the template images stored in the plural-template storage step 202'is predetermined (at "3", for example), and when the predetermined number is exceeded, the oldest acquired template, for example, is deleted.

The template is updated in step 202' in this way. As an alternative, the template of the lowest coincidence degree in the template matching step 103 may be deleted.

Then, the process proceeds to the camera pan and tilt head control step 107 for directing the view field of the camera 301 toward the target object, followed by proceeding to the alarm/monitor display step 108 for sounding an alarm or displaying the image of the target object on the monitor, as the case may be.

Upon completion of the alarm/monitor display step 108, the process is returned to the template matching step 103 for continuing the template matching process again.

The effects of this embodiment will be explained with reference to FIG. 13.

Figure 13:
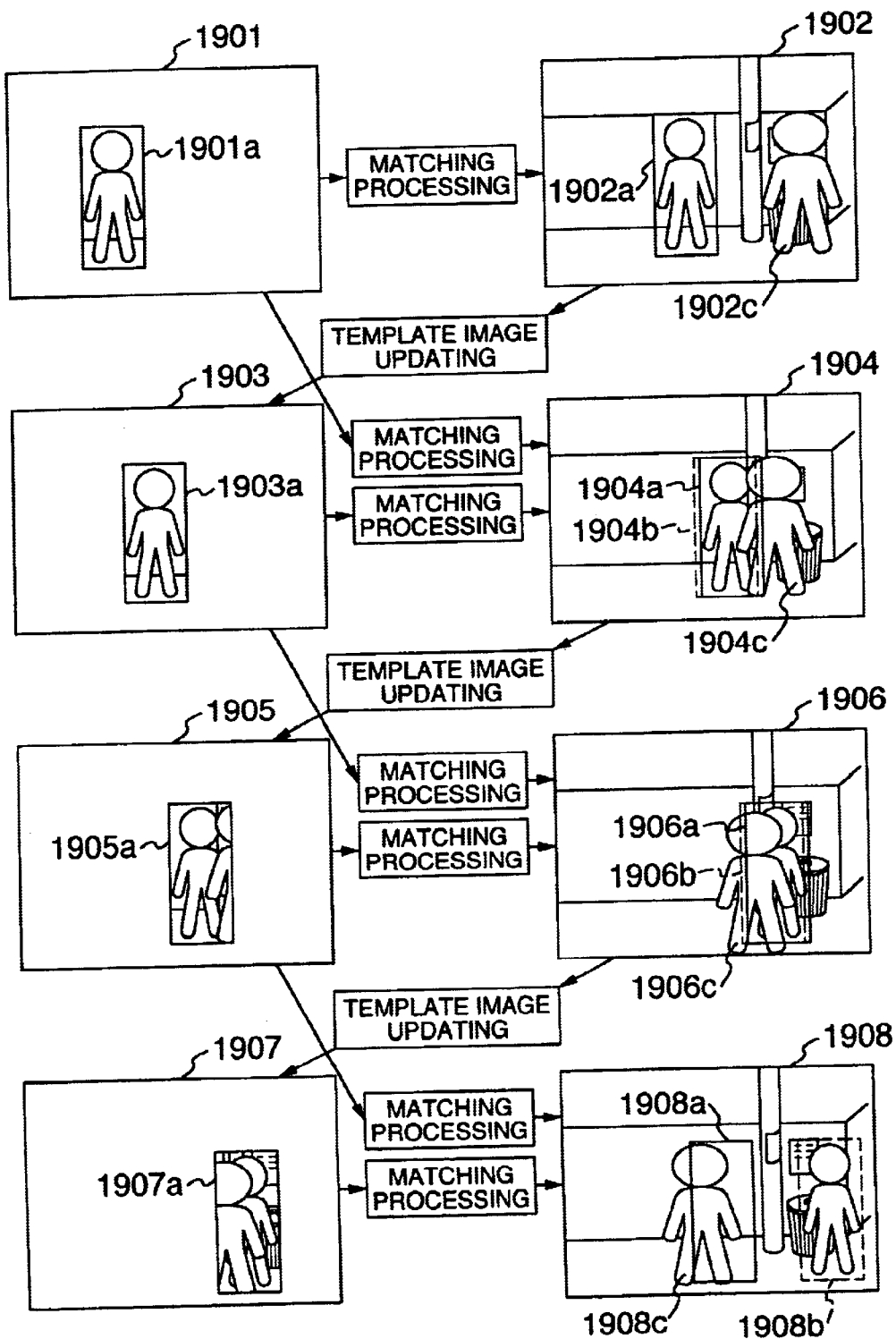
FIG. 13 is a diagram useful for explaining the operation and effect of the embodiment shown in FIG. 12.

FIG. 13 is a diagram for explaining the flow of the intruding object tracking process using example images, with reference to the case where a plurality of moving objects (man-like objects) are imaged in superposed relation within the imaging field. For comparison with the object tracking process according to the object tracking method described in FIG. 8, the same situation setting is assumed as in FIG. 14. The number of templates stored is assumed to be 2 (=number of frames subjected to template matching). Numeral 1901a designates a template image of the object updated at time t0−1, numeral 1901 a view showing the position of the template image 1901a in the input image at time point t0−1, numeral 1902 an input image at time point t0, numeral 1902a the position of the object detected by the template matching processing at time t0, numeral 1902c another moving object imaged at time point t0, numeral 1903a the template image at time point t0, numeral 1903 a view showing the position of the template image 1903a in the input image at time point t0, numeral 1904 the input image at time point t0+1, and numeral 1904a the position of the object detected by template matching at time point t0+1. Numeral 1904b attached to the rectangular area defined by dotted line designates the position where the template image is matched at the immediately preceding processing time point (t0−1 in this case), numeral 1904c another moving object imaged at time point t0+1, numeral 1905a the template image of the object updated at time point t0+1, numeral 1905 a view showing the position of the template image 1905a in the input image at time point t0+1, numeral 1906 the input image at time point t0+2, and numeral 1906a the position of the object detected by template matching at time point t0+2. Numeral 1906b attached to the rectangular area defined by dotted line designates the position where the template image at the immediately preceding time point (t0 in this case) is matched, numeral 1906c another moving object imaged at time point t0+2, numeral 1907a the template image updated at time point t0+2, numeral 1907 a view showing the position of the template image 1907a in the input image at time point t0+2, numeral 1908 the input image at time point t0+3, and numeral 1908a the position of the object detected by template matching at time point t0+3. Numeral 1908b attached to the rectangular area defined by dotted line designates the position where the template image at the immediately preceding processing time point (t0+1 in this case) is matched, and numeral 1908c another moving object imaged at time point t0+3.

Figure 14:
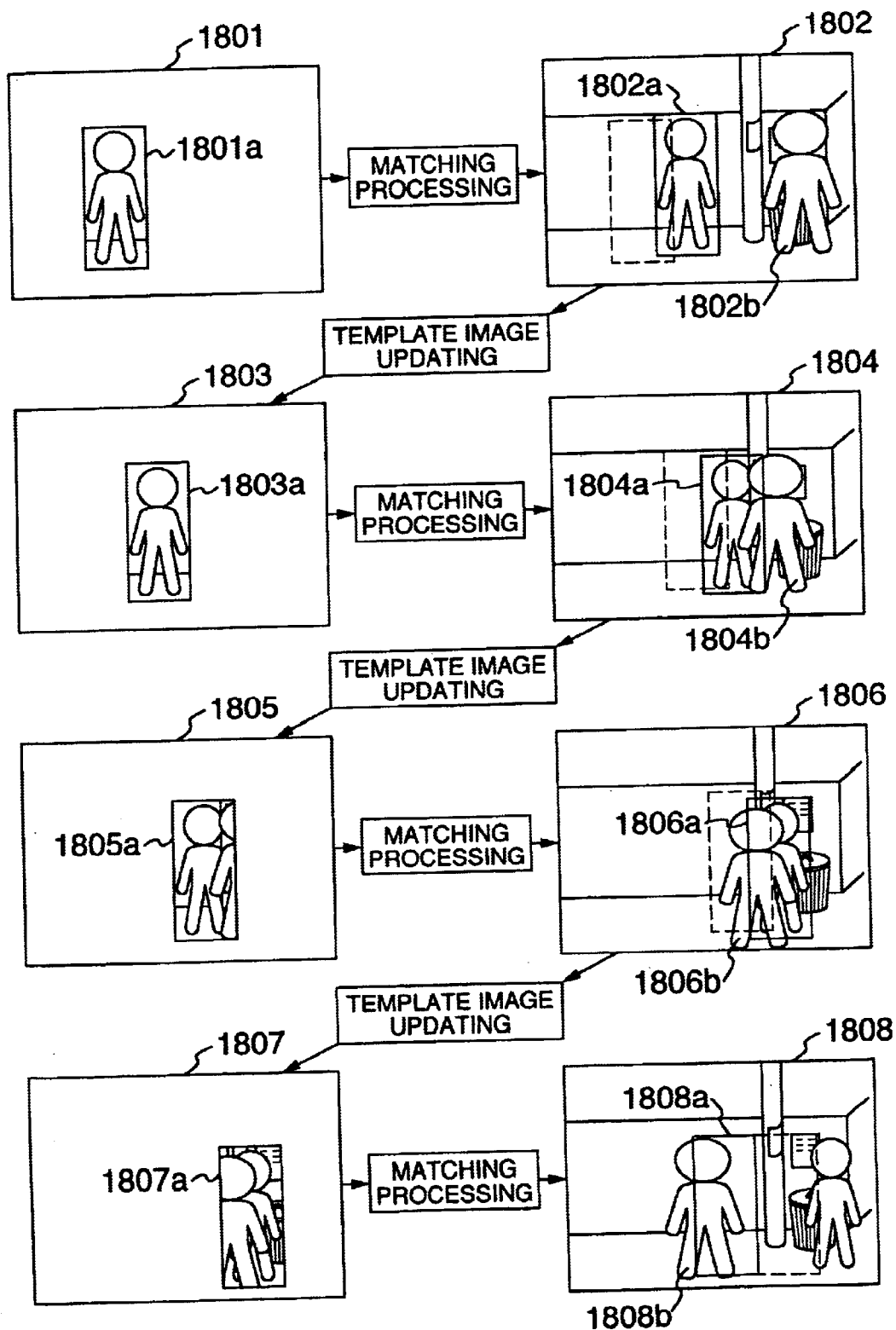
FIG. 14 is a diagram useful for explaining another problem of the template matching method described in FIGS. 5 and 7.

In the method shown in FIG. 14 to which the invention is not applied, the tracking of the target object, i.e. transition of the detected position of the target object at each moment involves the matching position obtained by the template image acquired at the immediately preceding time point (the immediately preceding frame), and therefore is represented in FIG. 13, by the rectangular images 1902a, 1904a, 1906a, 1908a indicated by solid lines in the input images 1902, 1904, 1906, 1908, respectively, at each time point. The tracking according to the embodiment of the invention, on the other hand, involves the rectangular images 1904b, 1906b, 1908b indicated by dotted lines in the input images 1904, 1906, 1908, respectively, at the respective time points in FIG. 13.

As seen from the input images 1904, 1906, in the case where the template is updated at a time point when a plurality of objects pass each other (the time point when two objects are superposed one on the other), the two objects in the template image are picked up undesirably. As a result, the pixels of the object being tracked occupy a lesser proportion of the template image. In the input image 1902 at time point t0, the objects have not yet passed each other, and therefore no tracking problem occurs. In this case, a small target object is being tracked. In the input image 1904 in which another moving object 1904c for time point t0+1 begins to be superposed, the template image produced is not yet imaged with another moving object. Therefore no problem is posed as yet and the target object is still captured. However, another moving object 1904c is imaged in the template image 905a produced based on this matching position. Even in the input image 906 which is substantially superposed by another moving object 1906c, the detected position 1906a used for matching with the template image 1905a having a greater proportion of another moving object 1904c imaged therein is not so displaced from the detected position 1906b used for matching with the template image 1903a in the immediately preceding frame. In the template 1907a stored at this time point, however, the pixels of the large object 1906c occupy a larger proportion of the template image than the pixels of the original target object in the template image. Thus, the template image is stolen by the large object 1906c, so that the large object 1908c is erroneously tracked at and after time point t0+2.

According to this invention, however, the matching is conducted using the template image 1905a previously stored, and therefore the original target object can be captured for the detected position 1908b.

As described above, according to the embodiment shown in FIG. 12, the template images in a predetermined number of frames obtained at different time points are matched independently of each other based on the positions detected in the template matching step 103. Even in the case where another object passes in front of the target object or the target object is hidden temporarily behind another object, therefore, the template position is not displaced from the target object, in view of the fact that the area having the maximum coincidence degree among a plurality of past template images is used as a template matching position. Thus, the target object can be tracked accurately without tracking any other object.

Now, a fourth embodiment of the invention will be explained with reference to FIG. 15.

Figure 15:
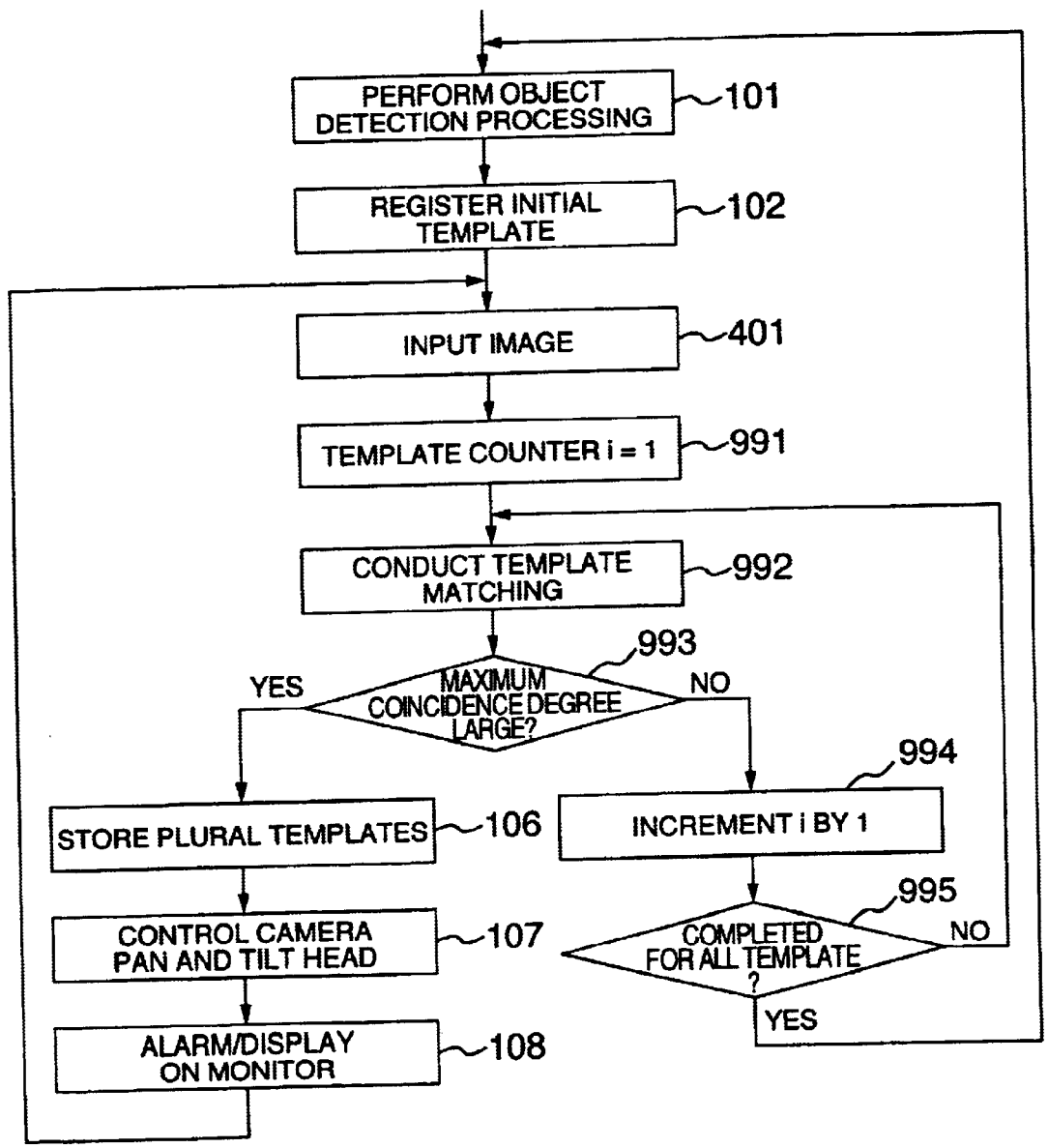
FIG. 15 is a flowchart for explaining the object tracking method according to another embodiment of the invention.

FIG. 15 is a flowchart showing an example of the processing operation according to the invention. In the process shown in FIG. 15, the template matching step 103, the branching step 210 and the maximum coincidence degree determining step 214 in the process according to the third embodiment described in FIG. 12 are replaced by a template counter reset step 991, a template matching step 992, a maximum coincidence degree determining step 993, a counter increment step 994 and a branching step 995. The other steps 101, 102, 401, 106, 107, 108 are identical to the corresponding ones in the third embodiment described with reference to FIG. 1 and therefore will not be described any more.

In FIG. 15, once the process is started, the image acquired from the input image for time point t0−1 is registered as a template for time point t0−1 in the initial template registration step 102 following the object detection step 101 already explained, after which the process proceeds to the image input step 401 for acquiring a new input image.

Then, in the template counter reset step 991, the value of a template counter i (not shown) stored in the work memory 306 is initialized to 1. After that, in the template matching step 992, the template matching is performed between the template image for time point t0−1 in store and the input image for time point t0 obtained in the image input step 401. In the maximum coincidence degree determining step 993, the process proceeds to the plural-template storage step 202 in the case where the maximum coincidence degree obtained in the template matching step 992 is not less than a predetermined value, while in the case where the maximum coincidence degree is less than the predetermined value, the process proceeds to the counter increment step 994. In the counter increment step 994, 1 is added to the value of the template counter i stored in the work memory 306 thereby to update the value of the template counter. Then, in the branching step 995, the process returns to the object detection step 101 in the case where the value of the template counter i stored in the work memory 306 reaches not less than a predetermined value (for example, 5 which is the value indicating the preceding number of frames up to which the template images are stored), while in the case where the value of the template counter i is less than the predetermined value, the process returns to the template matching step 992.

According to the embodiment of FIG. 15, a plurality of the template images stored are used for the input image in order of from the newest template image to the less latest (i.e. in order of from the latest template image stored most recently with respect to the time point at which the input image of concern is acquired to the less latest) for template matching, and in the case where the coincidence degree reaches or exceeds the predetermined value, the particular matching position is determined as a position where the target object exists. Thus, all the template images stored are not required to be subjected to the template matching process, thereby minimizing the calculation time required for the template matching process.

It will thus be understood from the foregoing description that according to this embodiment, even in the case where a plurality of moving objects are present within the monitor field or the target object is hidden behind another object temporarily, the target object can be tracked steadily and the application of the monitor using the imaging unit can be widened considerably.

While the present invention has been particularly described and shown with reference to the presently preferred embodiments thereof, it will be understood by those ordinary skilled in the art that various changes in form and detail and omissions may be made therein without departing from the scope of the invention.

For example, a computer program product embodying the computer program code means in a computable usable medium for implementing the object tracking method according to the invention described above is of course included in the scope of the present invention.

What is claimed is:

1. A tracking method for detecting an object in an image pickup field of an image pickup device, comprising the steps of:

forming from an image of said image pickup field a template image of a predetermined size including at least a part of said object;

storing said template image in a memory;

performing a template matching between an input image of said image pickup field from said image pickup device and said template image from said memory to detect a location of a part of said object in said input image which has a maximum degree of coincidence with said template image;

performing an edge density detection of said object over an expanded part of said input image which has a larger size than said predetermined size and includes said part of said object of said template image;

detecting a location of said object having a maximum edge density in said performing an edge density detection step;

compensating a location of said template image based on said location of said object having a maximum edge density so that a greater part of said template image contains said detected object; and updating said template image, a location of which is compensated, into a new template image for a next input image.

2. A method according to claim 1, wherein said performing an edge detection step comprises substeps of:

extracting edge density components contained in said expanded part of said present input image;

displaying accumulated quantities of x-axis and y-axis edge components on x-axis and y-axis, respectively; and detecting said portion having the maximum edge density from the accumulated quantities of x-axis and y-axis edge components on x-axis and y-axis.

3. A method according to claim 1, wherein a size of said expanded part of said input image is determined based on an apparent amount of movement of said object in said image pickup field.

4. A method according to claim 1, further comprising the step of:

controlling pan and tilt of said image pickup device so as to be directed toward said object based on a relation between said compensated location of said template image and a predetermined reference position in said image pickup field.

5. A tracking method for detecting an object in an image pickup field of an image pickup device, comprising the steps of:

forming from images of said image pickup field a predetermined number of template images, each of which has a predetermined size and includes at least a part of said object;

storing said template images in a memory;

performing a template matching between an input image of said image pickup field from said image pickup device and each of said template images from said memory to detect a location of a part of said object in said input images;

selecting a template image which has a maximum degree of coincidence in said performing a template matching step;

performing an edge density detection of said object over an expanded part of said input image which has a larger size than said predetermined size and includes said at least a part of said object at a location of said selected template image;

detecting a location of said object having a maximum edge density in said performing an edge density detection step;

compensating the location of said template image having a maximum degree of coincidence based on said location of said object having a maximum edge density so that a greater part of said template image contains said detected object; and updating said template image, a location of which is compensated, as a new template image for a next input image.

6. A method according to claim 5, wherein said predetermined number of template images are formed from input images at different points in time and then stored.

7. A method according to claim 6, wherein the updated template image is one of said predetermined number of template images which was formed and stored from the input image at earliest point in time.

8. A method according to claim 5, wherein a picture template having the lowest level of coincidence degree among said predetermined number of template images is updated with said new template image when the degree of coincidence of at least one of said predetermined number of template images is not less than a predetermined value.

9. A method according to claim 5, further comprising the step of:

controlling said image pickup device to be directed toward said object based on a relation between said detected location of said object and a predetermined reference position in said image pickup field.

10. A method according to claim 5, wherein said performing an edge density detection step comprises substeps of:

extracting edge components contained in said expanded part of said input image;

displaying accumulated quantities of x-axis and y-axis edge components on x-axis and y-axis, respectively; and detecting said part of said object having the maximum edge density from the accumulated quantities of x-axis and y-axis edge components on x-axis and y-axis.

11. A method according to claim 5, wherein the size of said expanded part of said input image is determined based on an apparent amount of movement of said object on said image pickup field.

12. A method according to claim 5, wherein said template matching is sequentially performed between the input image from said image pickup device and each of said predetermined number of template images, and when a location of a part of said object in said input image having a maximum degree of coincidence not less than said predetermined value is detected, the template matching using the remaining template images is terminated.

13. An object tracking apparatus for detecting and tracking an object in an image pickup field, comprising:

an image pickup device which takes an image in a range to be monitored;

a pan and tilt head with said image pickup device mounted thereon;

an image input interface for sequentially converting a video signal of an object acquired by said image pickup device in said monitor range into an input image signal;

an image processing unit connected to said image input interface which processes said input image signal;

a pan and tilt head control interface connected to said image processing unit and said pan and tilt head; and a template image storing unit connected to said image input interface and said image processing unit, wherein said image processing unit cuts out that part of an input image signal in advance to produce a template image of a predetermined size which includes at least a part of said object and store said template image in said template image storing unit, performs a template matching between said input image signal and said template image to detect a location of a part of said object in said input image having a maximum degree of coincidence with said template image, performs an edge detection of said object over an expanded part of said input image which has a larger size than said predetermined size and which includes said part of said object at location of said template image, detects a location of said object having a maximum edge density in said edge density detection, compensates the location of said template image based on said location of said object having a maximum edge density so that a greater part of aid template image contains said detected object, updates said template image, a location of which is compensated, into a new template image for a next input image signal, and controls said pan and tilt head based on said compensated location of said template image to direct said image pickup device toward said object.

14. A computer program product comprising:

a computer usable medium having computer readable program code means embodied in said medium for detecting and tracking an object in an image pickup field, said program code means comprising:

means for cutting out that part of an input image signal from an image pickup device which includes at least a part of said object to produce a template image of a predetermined size and storing said template image on a template image storing unit;

means for performing a template matching between an input image signal from said image pickup device and said template image from said memory to detect a location of a part of said object having a maximum degree of coincidence with said template image from said input image signal;

means for performing an edge density detection of said object over an expanded part of said input image which has a larger size than said predetermined size and includes said part of said object at a location of said template image;

means for detecting a location of said object having a maximum edge density in said means for performing an edge density detection;

means for compensating a location of said template image based on said location of said object having a maximum edge density so that a greater part of said template image contains said detected object;

means for updating said template image, the location of which is compensated, into a new template image for a next input image signal; and means for controlling said pan and tilt head based on said compensated location of said object so that said image pickup device is directed toward said object.

15. A computer program product comprising:

a computer usable medium having computer readable program code means embodied in said medium for detecting and tracking an object in an image pickup field, said program code means comprising:

means for cutting out from input image signals each sequentially supplied from an image pickup device a plurality of template images each having a predetermined size and including at least a part of said object and storing said template images on a template image storing unit;

means for performing a template matching between an input image signal from said image pickup device and each of said template images from said memory to detect a location of a part of said object in said input image;

means for selecting a template image which has a maximum degree of coincidence in said template matching means;

means for performing an edge detection of said object over an expanded part of said input image which has a larger size than said predetermined size and includes said part of said object at a said location of said selected template image;

means for detecting a location of said object having a maximum edge density in said means for performing said edge density detection;

means for compensating a location of said template image having a maximum degree of coincidence based on said location of said object having a maximum edge density so that a greater part of said template image contains said detected object;

means for updating said template image, a location of which is compensated into, a new template image for a next input image; and means for controlling said pan and tilt head based on the compensated location of said object so that said image pickup device is directed toward said object.

16. An object tracking apparatus for detecting and tracking an object in an image pickup field, comprising:

an image pickup device which takes an image in a range to be monitored;

a pan and tilt head with said image pickup device mounted thereon;

an image input interface for sequentially converting a video signal of an object acquired by said image pickup device in said monitor range into an input image signal;

an image processing unit connected to said image input interface which processes said input image signal;

a template image storing unit connected to said image input interface and said image processing unit; and a pan and tilt head control interface connected to said image processing unit and said pan and tilt head, wherein said image processing unit cuts out from sequentially input image signals a predetermined number of template images each including at least a part of said object, stores said template images in said template image storing unit, performs a template matching between an input image of said image pickup field from said image pickup device and each of said template images from said memory to detect a location of a part of said object in said input images, selects a template image which has a maximum degree of coincidence in said template matching step, performs an edge density detection of said object over an expanded part of said input image which has a larger size than said predetermined size and includes said part of said object at a location of said selected template image, detects a location of said object having a maximum edge density in said performing an edge density detection step, compensates the location of said template image having a maximum degree of coincidence based on said location of said object having a maximum edge density so that a greater part of said template image contains said detected object, updates said template image, a location of which is compensated, into a new template image for a next input image, and controls said pan and tilt head based on said compensated location of said template image so as to direct said image pickup device toward said object.

* * * * *